(12) United States Patent
Chen et al.

(10) Patent No.: US 9,240,956 B2
(45) Date of Patent: *Jan. 19, 2016

(54) COMMUNICATION SYSTEM USING ORBITAL ANGULAR MOMENTUM

(71) Applicant: Broadcom Corporation, Irvine, CA (US)

(72) Inventors: Xuemin Chen, Rancho Santa Fe, CA (US); Bradley Donald Blanche, Laguna Niguel, CA (US); Gordon Yong Li, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/785,902

(22) Filed: Mar. 5, 2013

(65) Prior Publication Data

US 2013/0235744 A1  Sep. 12, 2013

Related U.S. Application Data

(63) Continuation-in-part of application No. 13/715,237, filed on Dec. 14, 2012.

(60) Provisional application No. 61/663,878, filed on Jun. 25, 2012, provisional application No. 61/609,339, filed on Mar. 11, 2012.

(51) Int. Cl.
*H04L 25/14* (2006.01)
*H04L 12/911* (2013.01)
*H04L 27/26* (2006.01)

(52) U.S. Cl.
CPC ........... *H04L 47/82* (2013.01); *H04L 25/14* (2013.01); *H04L 27/2697* (2013.01)

(58) Field of Classification Search
None
See application file for complete search history.

(56) References Cited

U.S. PATENT DOCUMENTS

| | | | |
|---|---|---|---|
| 6,404,769 B1* | 6/2002 | Kapoor | 370/398 |
| 8,396,371 B2* | 3/2013 | Murshid et al. | 398/141 |
| 2003/0122954 A1* | 7/2003 | Kassatly | 348/335 |
| 2003/0130862 A1* | 7/2003 | Stern et al. | 705/1 |
| 2007/0143654 A1* | 6/2007 | Joyce et al. | 714/752 |
| 2008/0232243 A1* | 9/2008 | Oren et al. | 370/216 |
| 2010/0017548 A1* | 1/2010 | Iwahashi et al. | 710/56 |
| 2010/0061234 A1* | 3/2010 | Pai et al. | 370/230.1 |
| 2011/0154425 A1 | 6/2011 | Kim et al. | |
| 2012/0263466 A1* | 10/2012 | Djordjevic et al. | 398/65 |

(Continued)

FOREIGN PATENT DOCUMENTS

WO  WO 2012/084039 A1  6/2012

OTHER PUBLICATIONS

B. Thide, et al., *Utilization of photon orbital angular momentum in the low-frequency radio domain*, May 2007, pp. 1-4.

(Continued)

*Primary Examiner* — Anh-Vu Ly
(74) *Attorney, Agent, or Firm* — Brinks Gilson & Lione

(57) ABSTRACT

Different data communication architectures deliver a wide variety of content, including audio and video content, to consumers. The architectures may utilize orbital angular momentum to deliver more bandwidth across multiple channels than any single communication channel can carry. In some implementations, the communication architectures distribute data across multiple orbital angular momentum channels in a bonded channel group.

19 Claims, 24 Drawing Sheets

(56) References Cited

U.S. PATENT DOCUMENTS

| | | | |
|---|---|---|---|
| 2013/0235885 A1* | 9/2013 | Chen et al. | 370/468 |
| 2013/0239150 A1* | 9/2013 | Chen et al. | 725/62 |
| 2013/0239159 A1* | 9/2013 | Mamidwar et al. | 725/109 |
| 2013/0239160 A1* | 9/2013 | Chen et al. | 725/109 |
| 2013/0239161 A1* | 9/2013 | Chen et al. | 725/109 |

OTHER PUBLICATIONS

Johan Sjoholm, et al., *Angular Momentum of Electromagnetic Radiation, Fundamental physics applied to the radio domain for innovative studies of space and development of new concepts in wireless communications*, Diploma Thesis, May 2, 2007, Uppsala School of Engineering and Department of Astronomy and Space Physics, Uppsala University, Sweden, pp. 1-186.

H. Then, et al., *Detecting orbital angular momentum in radio signals*, arXiv:0805.2735v1 [astro-ph], May 18, 2008, pp. 1-5.

Thide B. et al. "Radio beam vorticity and orbital angular momentum", Internet Citation, Jan. 31, 2011, pp. 1-3, URL:http://arxiv.org.pdf/1101.6015.pdf.

European Search Report Corresponding to Application No. 13001020.0, Dated Mar. 16, 2015.

* cited by examiner

COMMUNICATION SYSTEM USING ORBITAL ANGULAR MOMENTUM

CROSS REFERENCE TO RELATED APPLICATIONS

This application claims the benefit of and priority to U.S. Provisional Application Ser. No. 61/663,878, filed Jun. 25, 2012, entitled, "Channel Bonding-Audio-Visual-Broadcast," and U.S. Provisional Application Ser. No. 61/609,339, filed Mar. 11, 2012, entitled, "Method and Apparatus for Using Multiple Physical Channels for Audio-Video Broadcasting and Multicasting," and is a continuation in part of U.S. patent application Ser. No. 13/715,237 filed on Dec. 14, 2012, entitled, "Channel Bonding with Orbital Angular Momentum", the contents of each of which are hereby incorporated by reference in their entireties.

TECHNICAL FIELD

This disclosure relates to communication techniques. In particular, this disclosure relates to a communication system using orbital angular momentum (OAM).

BACKGROUND

Rapid advances in electronics and communication technologies, driven by immense private and public sector demand, have resulted in the widespread adoption of smart phones, personal computers, internet ready televisions and media players, and many other devices in every part of society, whether in homes, in business, or in government. These devices have the potential to consume significant amounts of audio and video content. At the same time, data networks have been developed that attempt to deliver the content to the devices in many different ways. Further improvements in the delivery of content to the devices will help continue to drive demand for not only the devices, but for the content delivery services that feed the devices.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Multimedia content delivery, especially video delivery, requires entertainment networks to provide higher bit rates for supporting the distribution of multiple-quality video and HDTV or Ultra-HDTV streams from a central location, along with entire home coverage. Since the video applications are sensitive to bandwidth fluctuations, guaranteed bandwidth and quality of service (QoS) requirements are very hard to achieve for high quality video delivery. For example, products attempting to use wireless local area network (WLAN) technology for HD video distribution may fall well short of consumer expectations for link range and picture quality. One of the biggest deficiencies has been inadequate effective throughput. Although not a solution for all video-handling challenges, higher throughput may improve immunity to interference while delivering a means to handle degraded link conditions. Additionally, any excess bandwidth can be traded for extended reach and lower power consumption. A new technology, called orbital angular momentum (OAM), may be utilized to make additional communication channels available, for example, for bonding so as to transmit multiple channel bonded signals as described herein to achieve a higher effective throughput.

Figure 1:
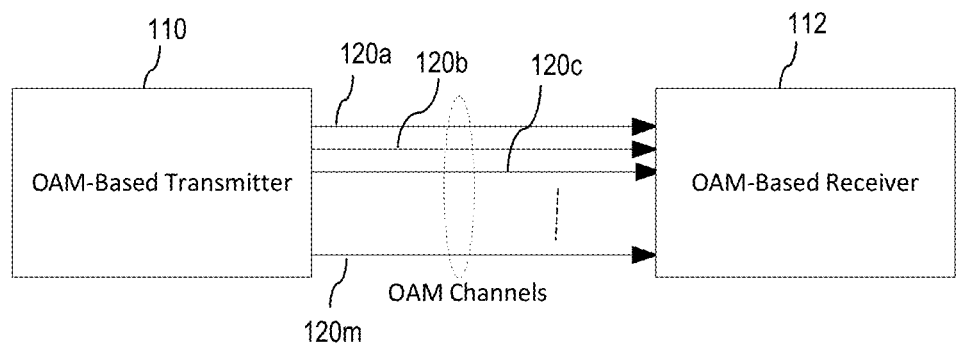
FIG. 1 is a schematic representation a OAM communication system.

A network system for implementing OAM is provided in FIG. 1 in which an OAM-based transmitter 110 and an OAM-based receiver 112 are capable of supporting m distinct OAM states (or channels) 120a-120m. For instance, these states may be denoted as l=0, 1, 2, ..., m−1. Furthermore, it can be assumed that the electromagnetic channel (optical or wireless) is impaired by noise, fading, and interferences. Some of these impairments are l-specific and others are frequency selective. While depicted in FIG. 1 as m distinct OAM channels (120a ... 120m), it is understood that such OAM channels may also be transmitted over a single (or a plurality) of physical communication links between OAM transmitter 110 and receiver 112.

Figure 2:
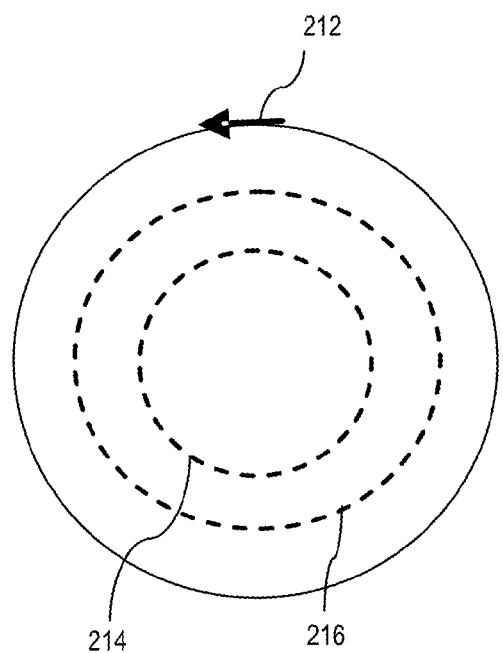
FIG. 2 is an illustration of orbital angular momentum.

In physics, electromagnetic waves can have both spin angular momentum (SAM) and orbital angular momentum (OAM) 212. An illustration of OAM is provided in FIG. 2. Using the analogy of a planet orbiting the sun, spin momentum is the planet rotating on its own axis while orbital momentum is the planet orbiting around the sun. The applications of OAM can include exploiting the OAM property of laser fields to trap and manipulate atoms, molecules, and microscopic particles. The OAM of electromagnetic waves can in theory have an infinite number of distinct states or orbits (e.g., distinct orbits 214, 216 illustrated in FIG. 2), denoted by natural number l. The number of distinct states achievable in practice is, however, limited by physical issues such as the sensitivity of the transmitting and receiving devices.

In conventional optical and wireless communications, only the spin angular momentum of electromagnetic waves is modulated and used to carry information. However, orbital angular momentum could also be added to optical and wireless signals, effectively creating distinct spiral signals on the same wavelength or frequency band. In this manner, in one or more embodiments, orbital angular momentum can be used to transmit multiple information streams on the same wavelength or frequency simultaneously, thus creating multiple information channels on the same wavelength or frequency.

With the advancement in digital signal processing it is possible to create optical communications systems that utilize OAM to achieve very fast data transmission rates (terabits per second and beyond). For wireless communications, the generation of multiple OAM states may be more difficult than the optical application. However, it has been shown that by properly controlling the antenna arrays, different OAM states can also be generated and combined to reproduce field characteristics, in the radio domain, which are very similar to those obtained in optics.

Figure 3:
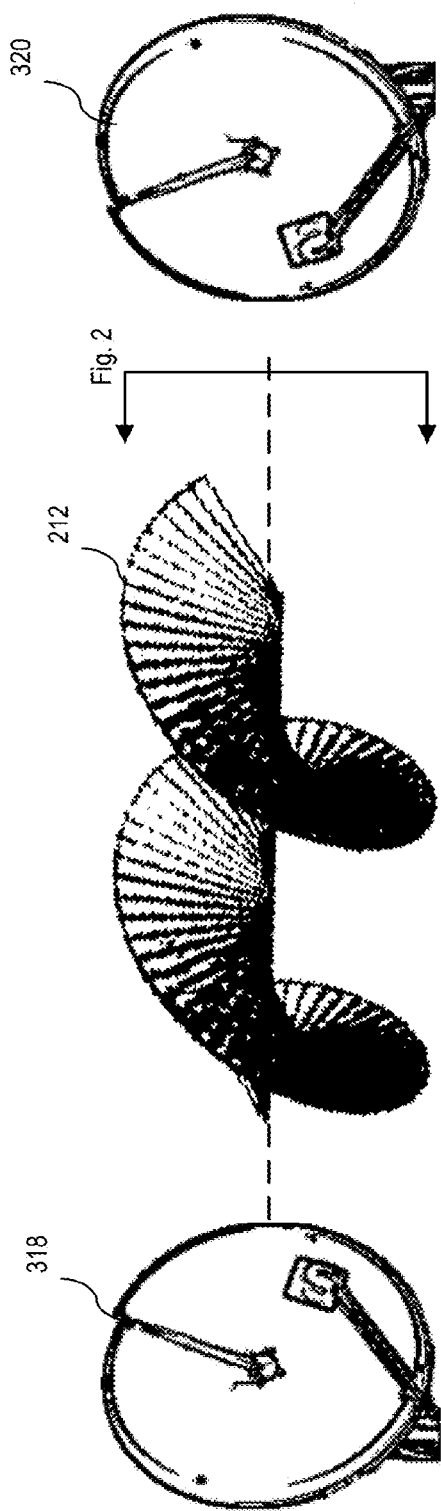
FIG. 3 is an illustration of an antenna structure that may be used for generating and/or detecting orbital angular momentum signals in accordance with one or more embodiments.

In one or more embodiments, the antenna structures for the generation and detection of OAM signals over an OAM communication link may include a parabolic antenna or antenna array. In one example, a helicoidal parabolic antenna 318 may be used as illustrated in FIG. 3. A helicoidal parabolic antenna 318 may be formed from transforming a parabolic dish antenna into a vortex reflector by properly elevating the dish surface with respect to the azimuthal angle. This may be visualized by cutting a radius in a dish and flexing the dish on one side of the cut relative to the other side perpendicular to the dish surface. Accordingly, a helicoidal transmission signal with an orbital angular momentum associated with the helicoidal parabolic antenna may be generated. A pair of helicoidal parabolic antennas may be used for an OAM communication link: one for the transmitter 318 and the other for the receiver 320. Although, it is contemplated herein that other antenna structures capable of transmitting and receiving signals having an OAM may also be used.

Figure 4:
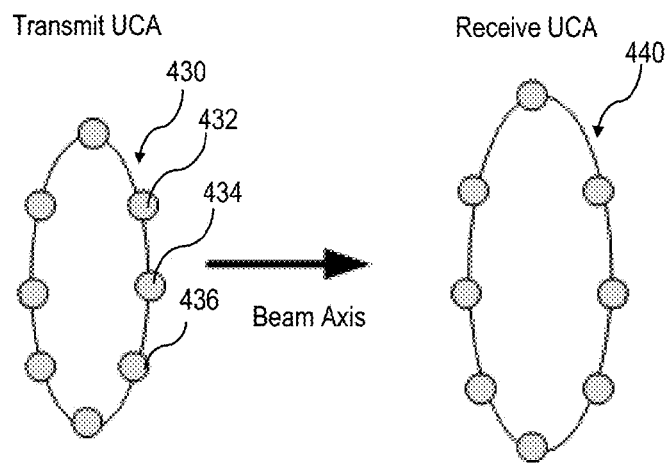
FIG. 4 is an illustration of an antenna array that may be used for generating and/or detecting orbital angular momentum signals in accordance with one or more embodiments.

In another example, an antenna array may be used for generating and detecting OAM signals as illustrated in FIG. 4. A uniform circular array (UCA) is one particular type of antenna array that may be used for the generation and detection of OAM signals. Although, it is contemplated herein that other antenna arrays capable of transmitting and receiving signals having an OAM may also be used. Uniform circular arrays 430 may have a number of antenna elements (e.g. 432, 434, 436) evenly spaced along a circle. For the generation of OAM-like signals, the antenna elements in a transmit UCA are fed with the identical input signal, but with a successive phase delay from element 432 to element 434. The OAM signal is decoded by the receiver with proper processing of the received signals in all antenna elements of the receive UCA 440. An example, a UCA of 8 elements is shown in FIG. 4 although any number of elements may be used. In addition, it is contemplated herein that different types of transmitting and receiving antennas may be used in combination.

Several channel bonding processing options may be utilized. In one embodiment, the distributor adds marker packets on a per-channel basis, for example in a round-robin manner. In another embodiment, the distributor generates and adds markers on a per-chunk basis, for example in a round-robin manner at chunk boundaries. In another embodiment, when packets from the same program will be routed to multiple communication channels, each packet receives a program ID and a sequence ID, and no marker packets are needed. In yet another embodiment, spare bits in network frames defined below the network layer, e.g., at the data-link layer, carry channel bonding information to the source. Further other embodiments or combinations of these embodiments may be utilized. However, any of the architectures or features of these techniques may be used together in conjunction with the discussed implementations for communicating over multiple channels with orbital angular momentum.

The principles of the present disclosure can thus be extended to create additional orbital angular momentum channels on the same wavelength or frequency as required to accommodate the aggregate transmission bandwidth required, where the additional orbital angular momentum channels created may be used as a bonded set of channels. In one embodiment, for a given communication channel configured to transmit a certain frequency, bonded orbital angular momentum channels may be generated and used at that same frequency, but with each channel having a different orbital angular momentum. In some embodiments, the bonded orbital angular momentum channels may be generated at different frequencies than other channels in the bonded set of channels.

By making use of additional channels each having a different orbital angular momentum, far greater amounts of data can be communicated between a source and a destination. The number of distinct communication channels (e.g., number of distinct orbital states at each frequency or wavelength) are practically only limited by certain physical issues such as the sensitivity of the transmitting and receiving devices. In one or more embodiments, the number of OAM channels bonded together on each frequency or wavelength may be selected based on a number of factors, including the sensitivity of the transmitting and receiving devices or desired or available complexity of the transmission.

In one or more embodiments, a system and associated procedures are described that realize the bonding of multiple OAM channels with interleaving and redundancy in both l-dimension and frequency-dimension. Such bonding can substantially increase potential data transmission rates as well as the overall reliability of the transmission.

For data communication, OAM can send an independent data stream through each "orbit" channel. This increases the channel capacity by a factor equivalent to the number of transmit streams. To support the QoS required by video delivery, in accordance with one or more embodiments, the disclosed OAM method uses orbital multiplexing on top of other multiplexing techniques to enhance robustness and reliability. For example, orbital multiplexing can be used on top of orthogonal frequency-division multiplexing (OFDM). Orbital multiplexing codes the information across the orbit and spectral domains by using multiple transmit and receive "orbital" devices. This, combined with OFDM modulation on each orbital channel, increases the diversity and, hence, the robustness of the system. This enables OAM to withstand channel impairments such as inter-symbol interference (ISI) and other interferences. Although, other known and future developed modulation techniques may be utilized in connection with orbit multiplexing of the OAM channels.

Using OFDM for each "orbit" or OAM channel provides robustness and high spectral efficiency for high data rate systems. OFDM divides the allocated spectrum into orthogonal subcarriers, and converts a serial input data stream into parallel data sequences, with each parallel data set being modulated by a bank of subcarriers. This allows every symbol to be modulated over a longer time duration, thus reducing the inter-symbol interference (ISI) effects caused by multipath propagation. Other advantages of OFDM include its scalability and easy implementation using a Fast Fourier transform (FFT).

Figure 5:
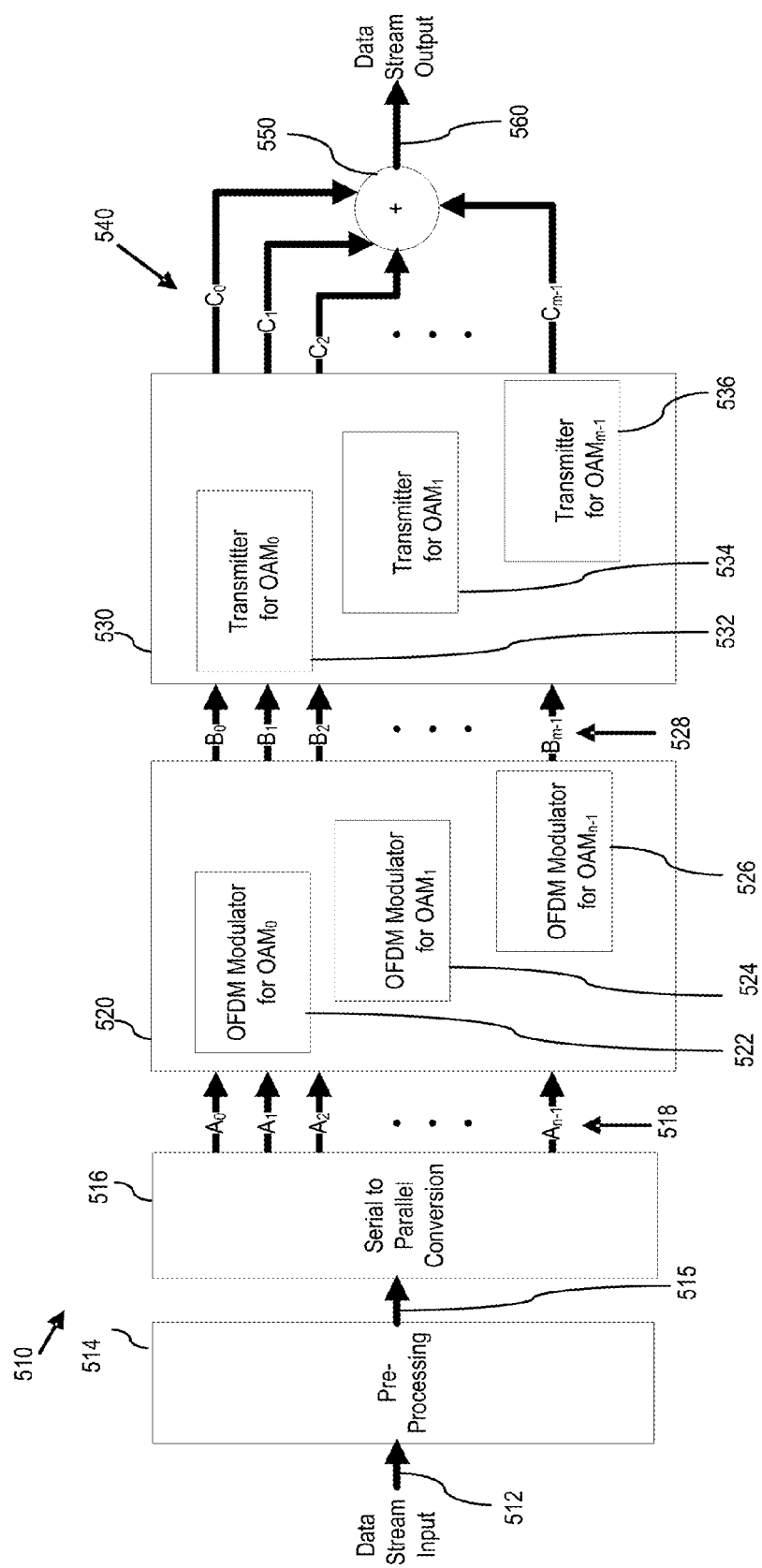
FIG. 5 is a schematic representation of a OAM-based transmitter.

FIG. 5 is a schematic view of an OAM-based transmitter 510 (which may correspond to OAM-based transmitter 110 of FIG. 1) in accordance with one or more embodiments. The OAM-based transmitter 500 may be implemented in one or more channel bonding devices, including the various channel bonding implementations described herein. For example, the OAM-based transmitter 510 may be a service provider head end (e.g., satellite or cable head end) for transmitting video or other broadcast data to a gateway or set top box or end user device. A data stream input 512 may be received by a preprocessing unit 514. The preprocessing unit 514 may break the streams into groups of bits which may be packaged as individual packets or individual communication units. In this manner, the preprocessing unit 514 may have the same functionality of the distributors described elsewhere in this application.

Further, preprocessing unit 514 may be configured to determine at least one characteristic of the source data and/or the communication channels. The distributor may select a number of communication channels to use in a bonded group of communication channels based on the at least one determined characteristic. The selection of communication channels to use in the bonded group may be modified variably based on any change in the at least one determined characteristic. In some implementations, the preprocessing unit may be configured to identify a transmission characteristic associated with transmission of the source data and variably select a plurality of communication channels having a selected orbital angular momentum (OAM) to be bonded as a bonded group of communication channels to accommodate the determined transmission characteristic.

The preprocessing unit 514 may partition the source data into groups of bits and distribute the groups to the communication channels based on the at least one determined characteristic. As such, the groups may be distributed to each channel in a unique order, according to an interleaved procedure, or in a round robin fashion, in response to the at least one characteristic. Further, data may be distributed using redundancy or independently mapped to a predetermined channel, in response to the at least one determined characteristic. For example, the at least one characteristic may include one or more of bonding configuration parameters, a bandwidth required by the source data, a desired reliability of transmission, and/or a video frame type. While exemplary characteristics are provided, the preprocessing unit 514 may perform the above noted actions based on other determined characteristics, as well.

The serial data 515 from the preprocessing unit 514 is provided to a serial-to-parallel converter 516. The serial-to-parallel converter 516 converts the serial stream 515 into a parallel data stream 518. The parallel data stream 518 is provided to a modulator circuit 520.

The modulator circuit 520 may include a modulator for each orbital state. As such, each orbital state may correspond to a different channel. Each modulator may be an OFDM modulator corresponding to each orbital state (e.g. each level of orbital angular momentum). As such, modulator 522 may correspond to the first channel, modulator 524 may correspond to the second channel, and modulator 526 may correspond to the last channel. It is understood that the number of channels is scalable based on application requirements. The modulator data 528 is transmitted from the modulator circuit 520 to the transmitter circuit 530. The transmitter circuit 530 may include an individual transmitter for each channel. For example, transmitter 532 may be provided for the first channel. Further, the transmitter 534 may be provided for the second channel, while transmitter 536 may be provided for the last channel. The transmitter output 540 is summed or multiplexed, for example, through an antenna arrangement 550 (e.g. may be a single antenna or antenna array). The antenna arrangement 550 may transmit a data output stream 560 to a receiving device, for example, a set top box or gateway.

As the data stream input 512 goes through preprocessing unit 514, the preprocessing unit 514 may divide the bit stream into the groups of n bits $(a_0, a_1, a_2, \ldots, a_{n-1})$, with n being the number of subcarriers supported by OFDM modulators 522, 524, 526. Each of these bit groups is mapped into another group of n output bits. This mapping depends on the type of the information carried by these data bits. Some types of information require faster transmission with low requirement on transmission reliability, while others require high transmission reliability with slower transmission.

Figure 6:
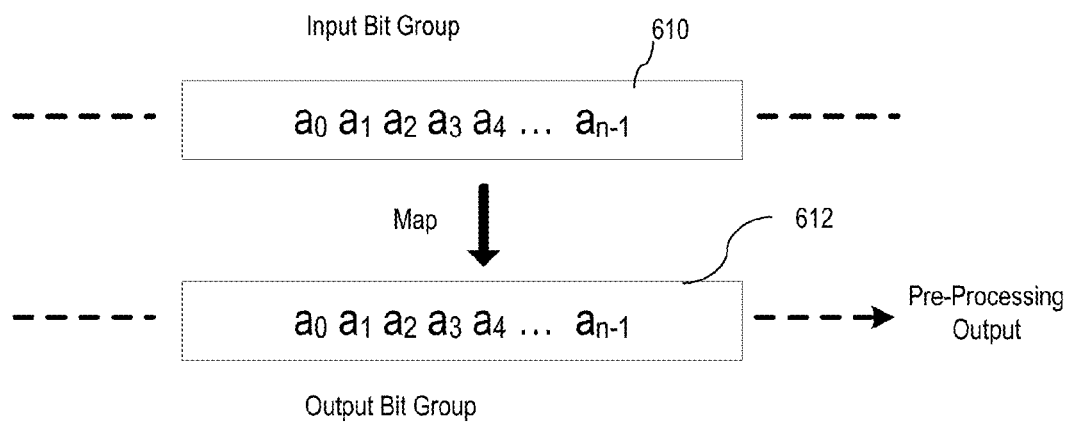
FIG. 6 is a schematic illustration of direct data mapping.
Figure 7:
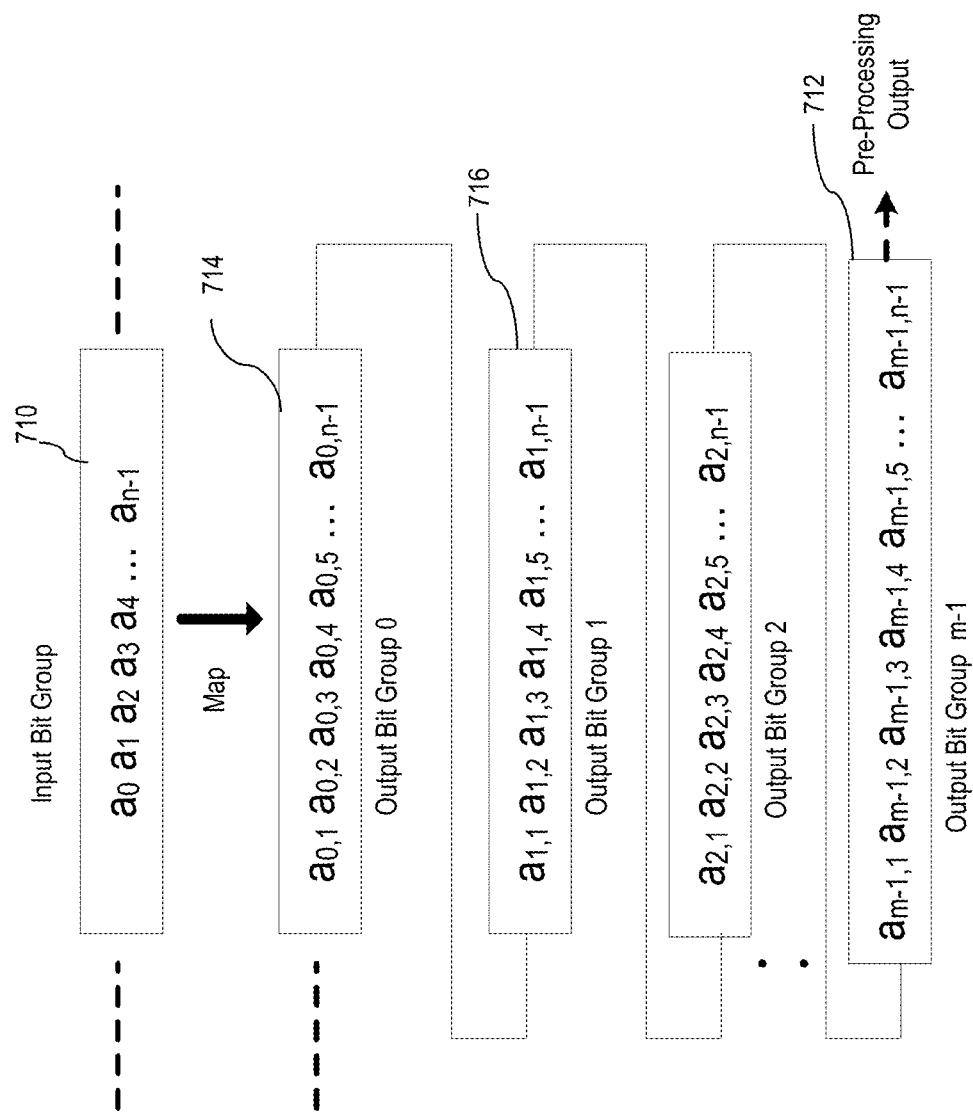
FIG. 7 is a schematic illustration of interleaved data mapping.

For data requiring fast transmission, the bits of each input bit group 610 may be directly mapped as the preprocessor output bit group 612 without any alternation, as shown in FIG. 6. However, for the types of information that require high transmission reliability, each input bit group 710 may be mapped into multiple preprocessor output bit groups 712, 714, 716, 718 via an interleaving map method, as illustrated in FIG. 7.

Figure 8:
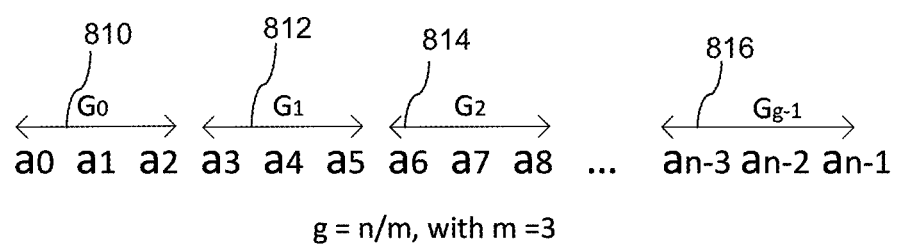
FIG. 8 is a schematic illustration of data groupings.
Figure 9:
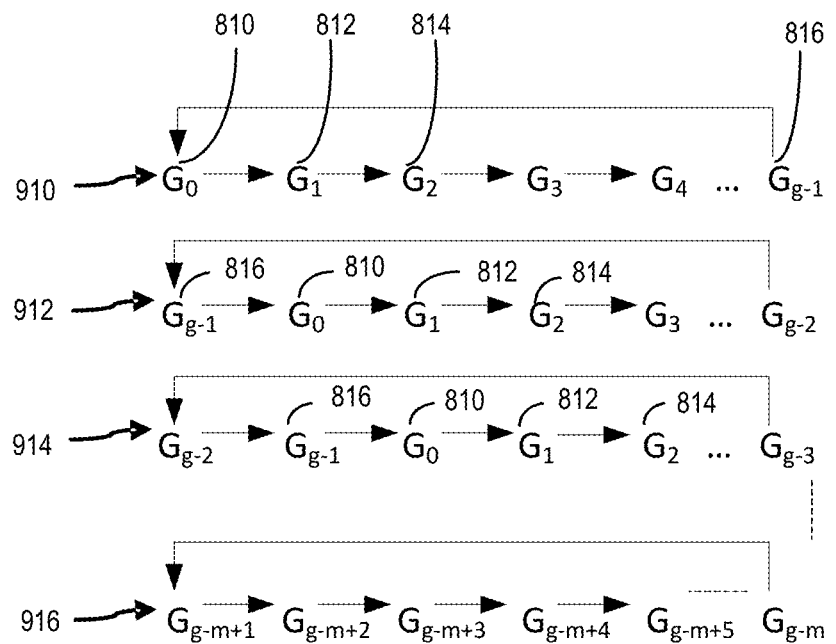
FIG. 9 is a schematic illustration of group shifting for each channel.

In the above interleaving procedure, the n bits of each input bit group are repeated m times, where m is the number of OAM states that the OAM transmitter and receiver are capable of supporting. For each repeated bit group 712, 714, 716, 718, the order of the n bits is reshuffled. One exemplary reshuffling scheme is shown in FIG. 8 (assuming m=3) and FIG. 9. First, each n bits in an input group are divided into g=n/m bit subgroups 810, 812, 814, 816, assuming n is a multiple of m. The g bit subgroups are, then, shifted right one subgroup for each repetition 910, 912, 914, 916. The repeated and reshuffled groups may, then, be concatenated and output from the preprocessor 514.

Figure 10:
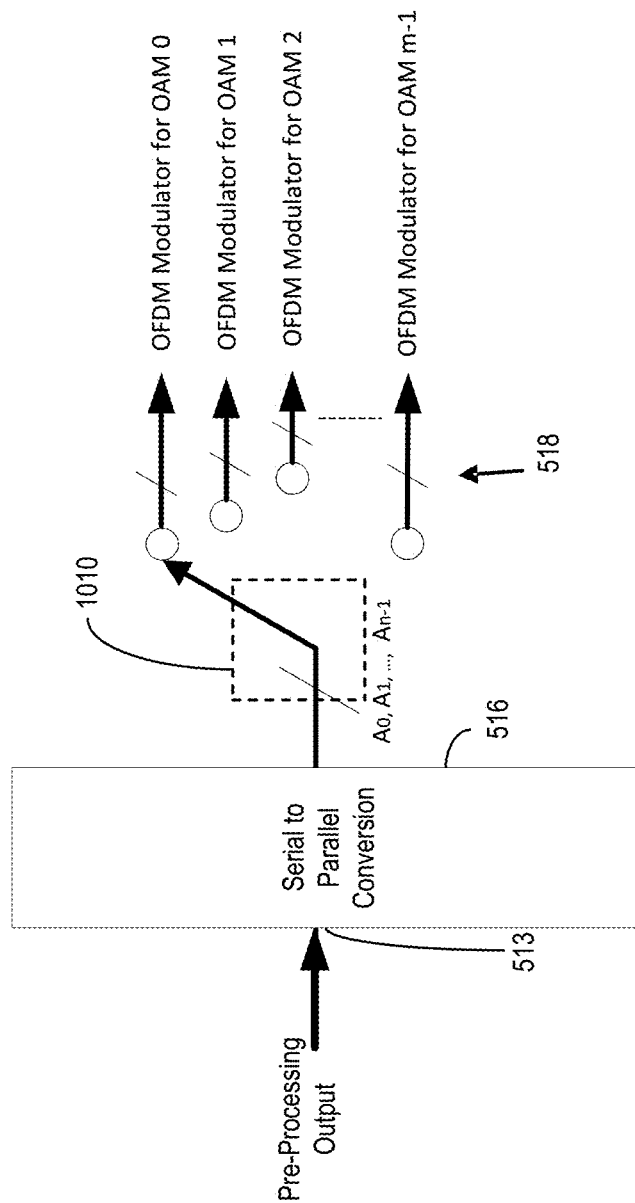
FIG. 10 is a schematic illustration of the serial-to-parallel conversion.

The output bits from the preprocessing module 514 may constitute a continuous serial bit stream. This bit stream may be provided to the serial-to-parallel conversion module 516, as shown in FIG. 10. This serial-to-parallel conversion module 516 distributes 1010 each n serial bits $A_0, A_1, A_2, \ldots,$ and $A_{n-1}$ in a bit group into an OFDM modulator 522, 524, 526 of modulator circuit 520 as parallel OFDM symbol bits 518. For one example scheme of distribution, the serial-to-parallel conversion module, distributes the OFDM symbols in a round-robin fashion. Although, any distribution scheme may be used as discussed elsewhere herein.

Figure 11:
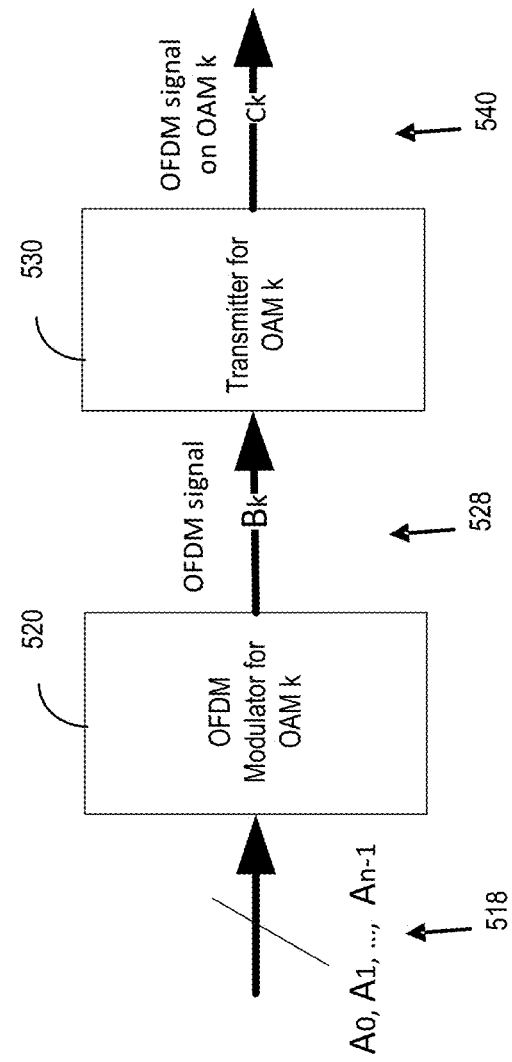
FIG. 11 is a schematic illustration of the ODFM Modulator and transmitter.

The system may include m OFDM modulators, one for each supported OAM state. The output OFDM signal of a modulator 520 is then sent to the corresponding OAM transmitter 520, as illustrated in FIG. 11. The OAM transmitter 530 transmits the signal on the OAM channel of a given OAM state.

Figure 12:
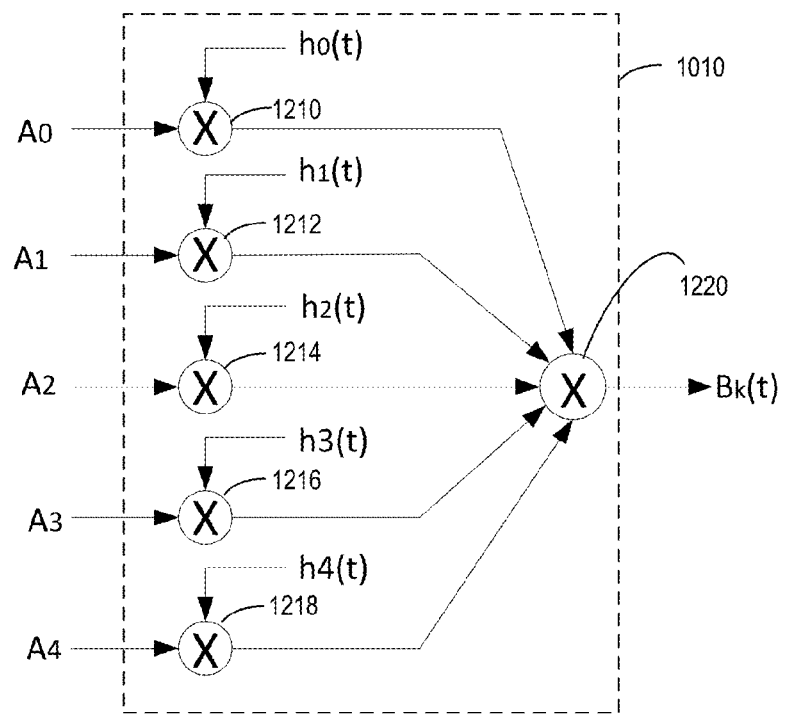
FIG. 12 is an illustration of the modulation process.
Figure 13:
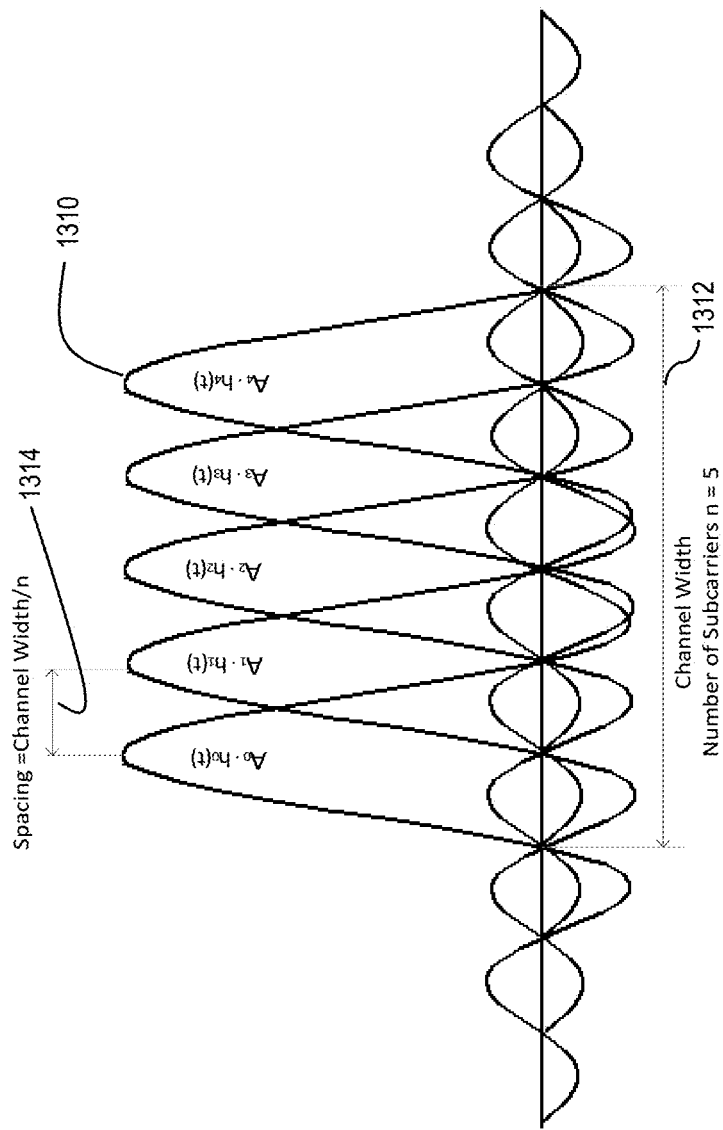
FIG. 13 is an illustration of a transmitted channel with sub-carriers.

In one example, the operation of an OFDM modulator k is shown in FIG. 12, assuming that n=m=5 (thus g=1). Each OFDM symbol bit $A_i$(i=0, 1, 2, 3, 4) is modulated by a subcarrier function $h_i(t)$ 1210, 1212, 1214, 1216, 1218. The modulated signal bits are summed as denoted by reference numeral 1220. The sum of all modulated symbol bits is output to the transmitter for OAM k as an OFDM signal 1310 $B_k$. The OFDM signal $B_k$ is illustrated in the frequency domain in FIG. 13. A sub-carrier spacing 1314 may be defined as the channel width divided by the number of subcarriers. The channel width is denoted by reference numeral 1312.

Figure 14:
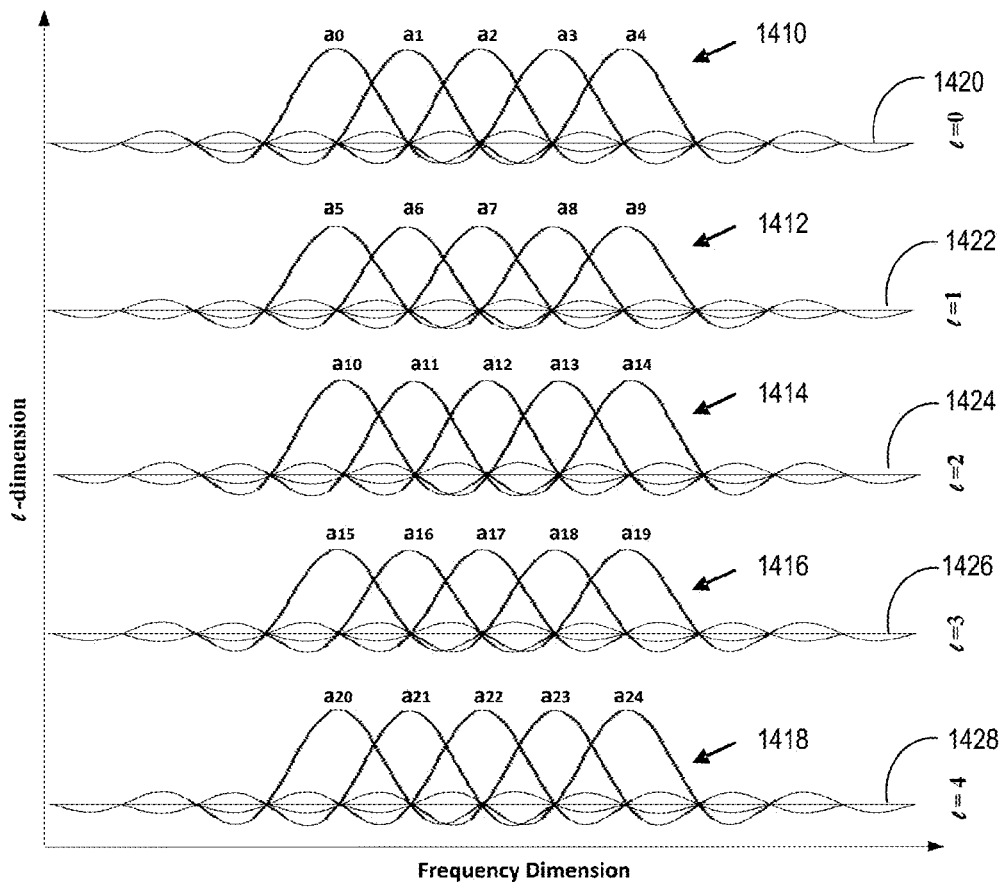
FIG. 14 is an illustration of each transmitted channel when mapped directly.

For the direct map method of the preprocessing module, FIG. 14 shows one implementation where input bit streams $a_0, a_1, a_2, \ldots,$ and $a_{n-1}$ are directly mapped into five distinct OFDM symbols. Each of these symbols 1410, 1412, 1414, 1416, 1418 are carried on a separate "orbital" or OAM channel 1420, 1422, 1424, 1426, 1428.

Figure 15:
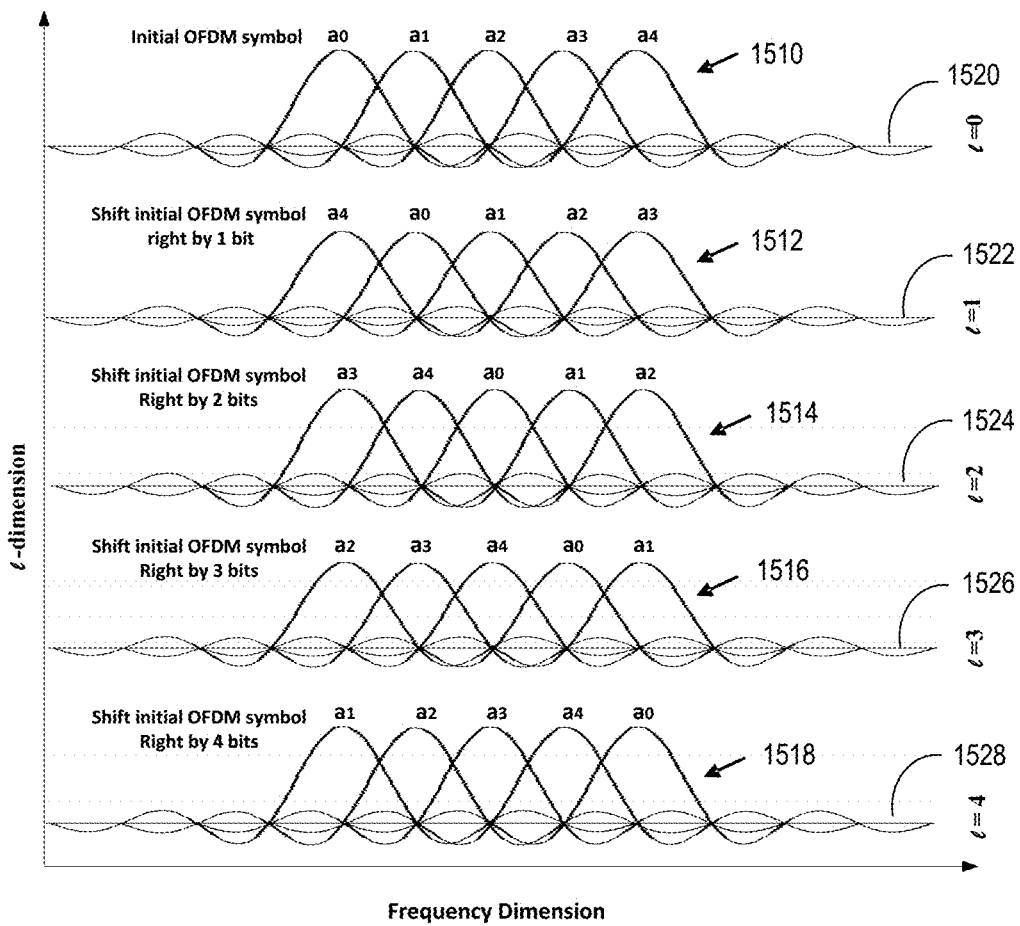
FIG. 15 is an illustration of each transmitted channel with interleaving.
Figure 16:
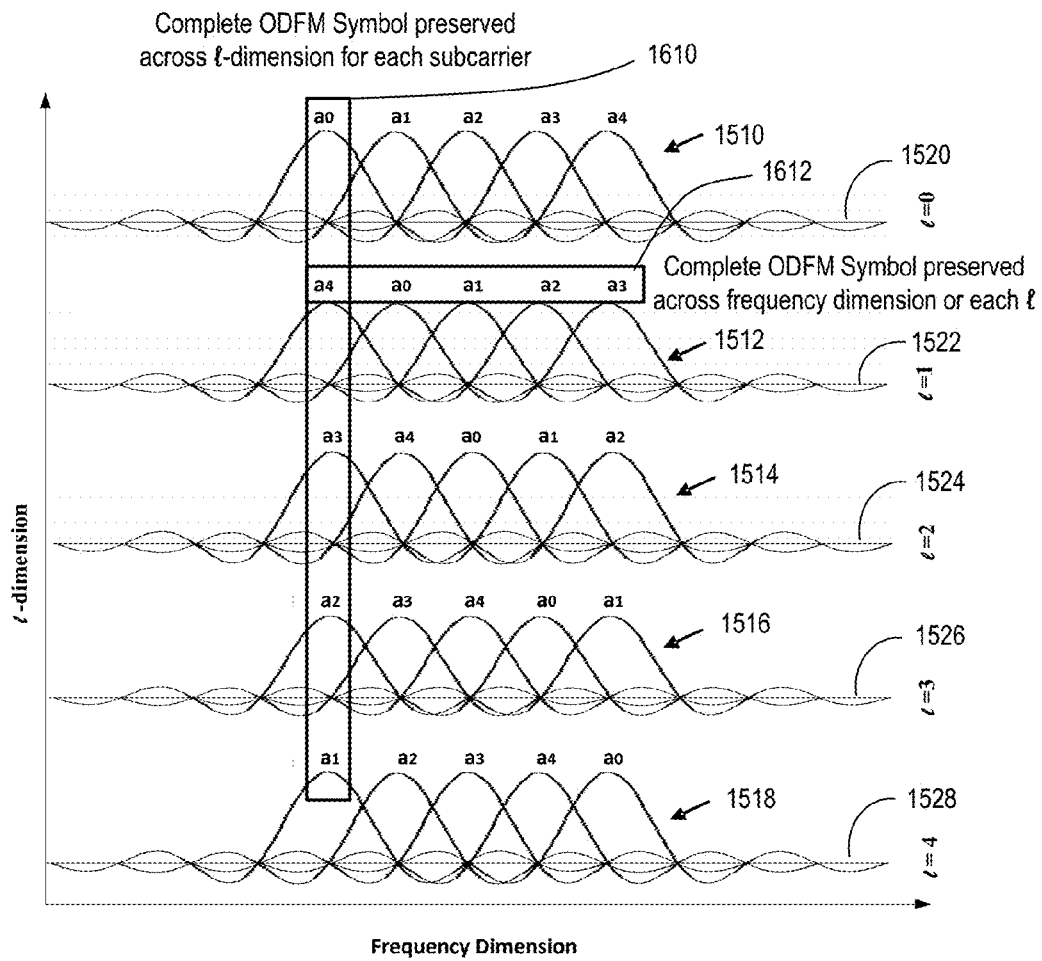
FIG. 16 is an illustration of the interleaved transmitted channels and highlighting data redundancy.

As can be seen, the direct map method illustrated does not provide any redundancy across l-domain, since the input data bit stream is not repeated. In contrast, for the interleaving map method of the preprocessing module, each five bits of the input data bit group ($a_0, a_1, a_2, a_3,$ and $a_4$) are repeated five times, with each repeated five bits being consecutively shifted, as illustrated in FIG. 15. As such, a distinct OFDM symbol 1510, 1512, 1514, 1516, 1518, is formed on each channel 1520, 1522, 1524, 1526, 1528, containing the same bits. The above interleaving procedure allows the input data bit stream to be transmitted with redundancy 1610 across l-domain, as shown in FIG. 16. In addition, the complete OFDM symbol is preserved 1612 across both the frequency dimension and the l-dimension.

As mentioned above, the channels between the OAM-based transmitter 110 and the OAM-based receiver 112 may be subject to l-specific, as well as, frequency-selective impairments. The information bits that are directly mapped by the preprocessing module are protected by the OFDM's robustness against frequency selective impairments in each OAM channel. However, directly mapped information bits may not be protected against l-specific impairments, since no redundancy is provided for the l-dimension. In contrast, the information bits that are mapped by the preprocessing module through the interleaving procedure may be protected by the OFDM's robustness against frequency selective impairments in each OAM channel. The information bits are also protected against l-specific impairments, since each OFDM symbol is repeated across the OAM domain. Furthermore, because the information of each OFDM symbol is carried on each subcarrier, the complete OFDM symbol bits can be recovered, as far as, the information bits on any subcarrier across l-domain can be correctly decoded (even if all other subcarriers are corrupted and their carried bits cannot be correctly decoded).

Figure 17:
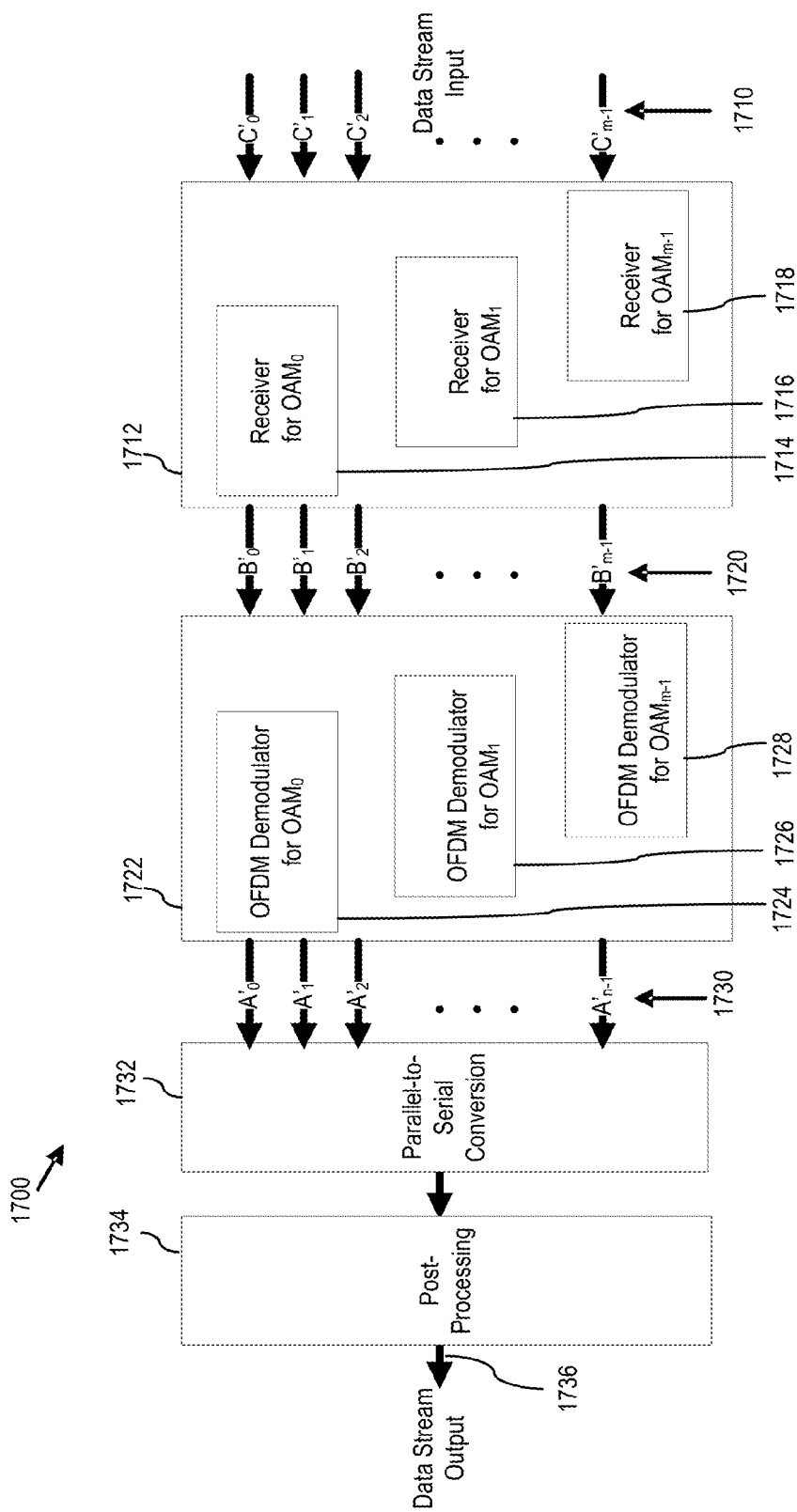
FIG. 17 is a schematic illustration an OAM receiver for channel bonding.

FIG. 17 is a schematic view of an OAM-based receiver 1700 in accordance with one or more implementations of the system. The data stream input 1710 is received by the OAM-based receiver 1700 (e.g., corresponding to the receiver 112 in FIG. 1) from an OAM-based transmitter (e.g., 110 from FIG. 1). The data stream input 1710 is provided to a receiver circuit 1712. The receiver circuit 1712 includes a receiver for each orbital state and/or channel. As such, receiver 1714 may be configured for a first channel (e.g., OAM state 0). Further, receiver 1716 may be configured to receive a second channel (e.g., OAM state 1) and receiver 1718 may be configured to receive the last channel (e.g., OAM state m−1). The receiver circuit 1712 provides the parallel orbital channels to demodulator circuit 1722. The demodulator circuit 1722 may include a demodulator for each channel. For example, the first channel may be demodulated by demodulator 1724. The second channel may be demodulated by demodulator 1726, and the last channel may be demodulated by demodulator 1728. In some implementations, the demodulators 1724, 1726, 1728 may be OFDM demodulators. The demodulator circuit 1722 may remove the $h_l(t)$ function demodulation from each channel and reconstruct the data stream. The demodulator circuit 1722 may use redundancy provided across each channel to correct any errors in the transmission and provide parallel outputs 1730 across the orbital channels to the parallel to serial conversion module 1732. The parallel to serial conversion module 1732 generates a single serial stream that is provided to the post processing module 1734. The post processing module 1734 may remap the bits into the original data stream and provide an output data stream 1736 matching original stream received by the OAM based transmitter.

Figure 18:
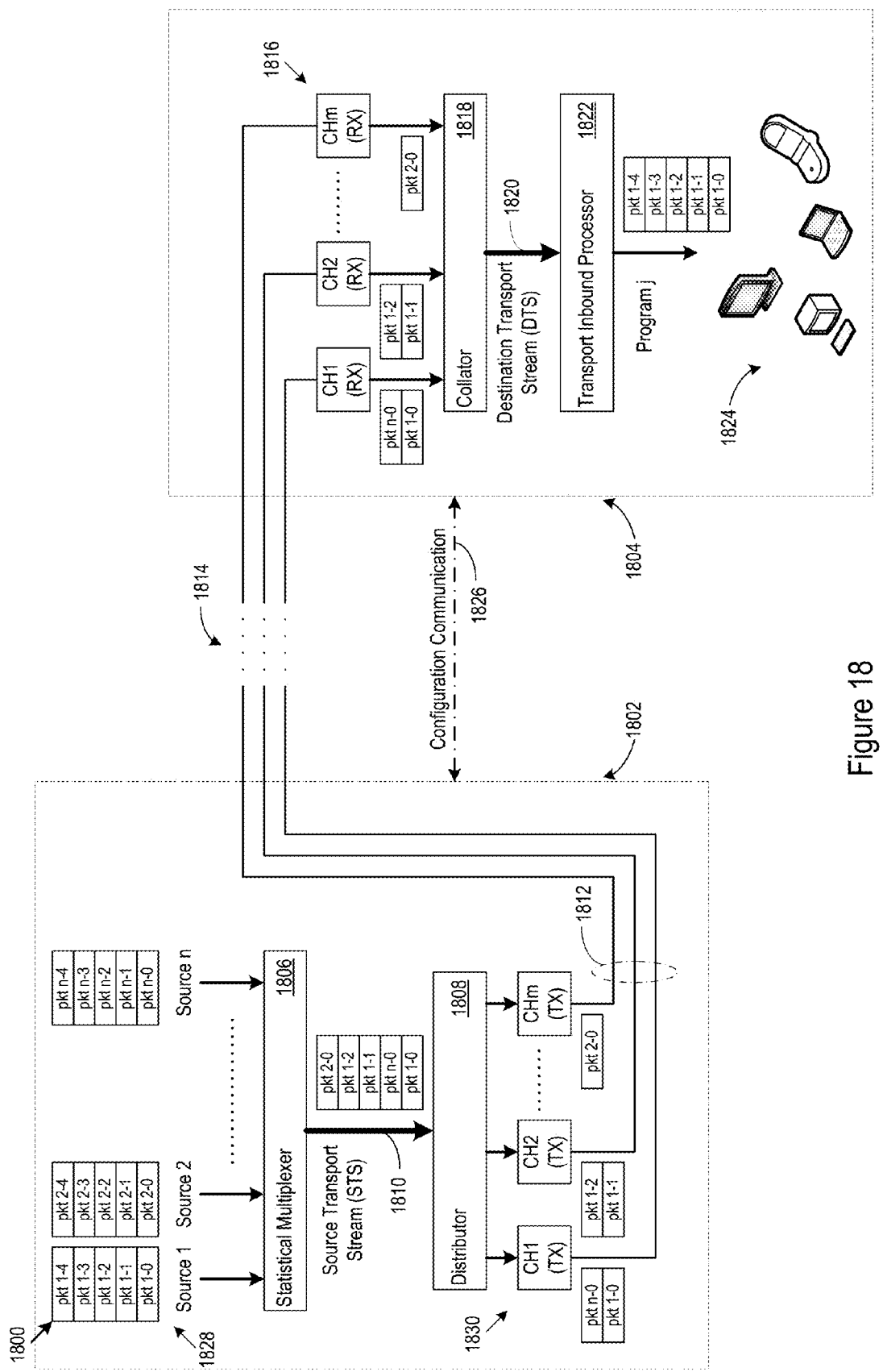
FIG. 18 shows an example of a content delivery architecture that employs channel bonding.

FIG. 18 shows an example content delivery architecture 1800 implemented with channels having varied orbital angular momentum. The architecture 1800 delivers data (e.g., video, audio and/or graphic content, streams, or programs or other types of content that may be transmitted) from a source 1802 to a destination 1804. In one or more embodiments, the source 1802 may include satellite, cable, or other media providers, and may represent, for example, a head-end distribution center that delivers content to consumers. In one embodiment, the source 1802 may receive the data from one or more content inputs 1828 in the form of Motion Picture Expert Group 2 (MPEG2) Transport Stream (TS) packets, when the data is audio/visual programming, for example. The source 1802 may receive data for transmission to the destination 1802 in any format compatible with the teachings of the present disclosure. The destination 1804 may be a home, business, mobile device, or other location, where, for example, a processing device (e.g., a set top box) processes the data sent by and received from the source 1802.

In one or more embodiments, the source 1802 may include a statistical multiplexer 1806 and a distributor 1808. The statistical multiplexer 1806 helps make data transmission efficient by reducing idle time in the source transport stream (STS) 1810. In that regard, the statistical multiplexer 1806 may interleave data from multiple input sources together to form the transport stream 1810. For example, the statistical multiplexer 1806 may allocate additional STS 1810 bandwidth among high bit rate program channels and relatively less bandwidth among low bit rate program channels to provide the bandwidth needed to convey widely varying types of content at varying bit rates to the destination 1804 at any desired quality level. Thus, the statistical multiplexer 1806 very flexibly divides the bandwidth of the STS 110 among any number of input sources.

Several input sources 1828 are present in FIG. 18: content input 1, content input 2, …, content input n. There may be any number of such input sources 128 carrying any type of audio, video, graphics or other type of data (e.g., web pages or file transfer data) and in any type of format. Specific examples of source data include MPEG or MPEG2 TS packets for digital television (e.g., individual television programs or stations), H.264/MPEG-4 Part 10 or AVC (Advanced Video Coding) video, High Efficiency Video Coding (HVEC) video (e.g., H.265/MPEG-H), 4K×2K video, and 8K×4K video, but the content input sources 1828 may provide any type of input data. The source data from the input content sources 1828 (e.g., the MPEG 2 packets) may include program identifiers (PIDs) that indicate a specific program (e.g., which program, channel, television station, etc.) to which the data in the packets belongs.

In one or more embodiments, the STS 1810 may have a data rate that exceeds the transport capability of any one or more communication links between the source 1802 and the destination 1804. For example, the STS 1810 data rate may exceed the data rate supported by a particular communication channel exiting the source 1802 such that multiple communication channels may be required and/or desired to accommodate the overall data rate for the STS 1810. To help deliver the aggregate bandwidth of the STS 1810 to the destination 1804, the source 1802 may include a distributor 1808 and modulators 1830 that feed a group of communication channels.

The group of channels may include at least two channels transmitting with a different orbital angular momentum. In some implementations, multiple channels may be transmitted at the same frequency while having different orbital angular momentums. In some implementations, both frequency and orbital angular momentum may be varied across the group of channels.

In some implementations, the groups of channels may be channel bonded such that the group of channels effectively serves as a single pipe and a distributor allocates portions of the data stream to each channel to improve the transmission rate of the data stream from the source to the destination. The distribution of the data to each channel happens according to a strategy whereby the receiver may efficiently reassemble the portions of data from each channel into a single output data stream that substantially matches the input data stream.

In other words, the source 1802 distributes the aggregate bandwidth of the STS 1810 across multiple outgoing communication channels that form a bonded channel group 1812, and that together provide the bandwidth for communicating the data in the STS 1810 to the destination 1804.

The distributor 1808 may be implemented in hardware, software, or both. The distributor 1808 may determine which data in the STS 1810 to send on which communication channel. As will be explained in more detail below, the distributor 108 may divide the STS 1810 into chunks of one or more packets. The chunks may vary in size over time, based on the communication channel that will carry the chunk, the program content in the chunk, or based on any other desired chunk decision factors implemented in the distributor 1808. The distributor 1808 may forward any particular chunk to the modulator for the channel that the distributor 1808 has decided will convey that particular chunk to the destination 1804.

In that regard, the multiple individual communication channels within the bonded channel group 1812 provide an aggregate amount of bandwidth, which may be less than, equal to, or in excess of the aggregate bandwidth of the STS 1810. As just one example, there may be three 30 Mbs physical cable channels running from the source 1802 to the destination 1804 that handle, in the aggregate, up to 90 Mbs. The communication channels in the bonded channel group 1812 may be any type of communication channel, including xDSL (e.g., VDSL, VDSL2, ADSL or ADSL 2 channels), coaxial cable channels, wireless channels such as satellite channels or IEEE 802.11a/b/g/n/ac channels or 60 GHz WiGig channels, Cable TV channels, WiMAX/IEEE 802.16 channels, Fiber optic, xPON (e.g., EPON, GPON, etc.), 10 Base T, 100 Base T, 1000 Base T, power lines, cellular channels (e.g., LTE, 3GPP, etc.), orbital angular momentum (OAM) channels or other types of communication channels.

The bonded channel group 1812 travels to the destination 1804 over any number of transport mechanisms 1814 suitable for the communication channels within the bonded channel group 1812. The transport mechanisms 1844 may include physical cabling (e.g., fiber optic or cable TV cabling), wireless connections (e.g., satellite, microwave connections, 802.11a/b/g/n connections), or any combination of such connections.

At the destination 1804, the bonded channel group 1812 is input into individual channel demodulators 1816. The channel demodulators 1816 recover the data sent by the source 1802 in each communication channel. A collator 1818 collects the data recovered by the demodulators 1816, and may create a destination transport stream (DTS) 1820. The DTS 1820 may be one or more streams of packets recovered from the individual communication channels as sequenced by the collator 1818.

The destination 1804 also includes a transport inbound processor (TIP) 1822. The TIP 1822 processes the DTS 1820. For example, the TIP 1822 may execute program identifier (PID) filtering for each channel independently of other channels. To that end, the TIP 1822 may identify, select, and output packets from a selected program (e.g., a selected program 'j') that are present in the DTS 1820, and drop or discard packets for other programs. In the example shown in FIG. 1, the TIP 1822 has recovered program 'j', which corresponds to the program originally provided by Source 1. The TIP 1822 provides the recovered program to any desired endpoints 1824, such as televisions, laptops, mobile phones, and personal computers. The destination 1804 may be a set top box, for example, and some or all of the demodulators 1816, collator 1818, and TIP 1822 may be implemented as hardware, software, or both in the set top box.

The source 1802 and the destination 1804 may exchange configuration communications 1826. The configuration communications 1826 may travel over an out-of-band or in-band channel between the source 1802 and the destination 1804, for example in the same or a similar way as program channel guide information, and using any of the communication channel types identified above. One example of a configuration communication is a message from the source 1802 to the destination 1804 that conveys the parameters of the bonded channel group 1812 to the destination 1804. More specifically, the configuration communication 1826 may specify the number of communication channels bonded together; identifiers of the bonded communication channels; the types of programs that the bonded communication channels will carry; marker packet format; chunk, program packet, or marker packet size; chunk, program packet, or marker packet PID or sequence number information, or any other chunk or bonding configuration information that facilitates processing of the bonded channel group 1812 at the destination 1804. One example of a configuration communication message from the destination 1804 to the source 1802 is a configuration communication that specifies the number of communication channels that the destination 1804 may process as eligible bonded channels; identifiers of the eligible bonded channels; status information concerning status of the demodulators 1816, e.g., that a demodulator is not functioning and that its corresponding communication channel should not be included in a bonded channel group; channel conditions that affect bit rate or bandwidth; or any other information that the source 1802 and the distributor 1808 may consider that affects processing of the data from the sources into a bonded channel group.

Figure 19:
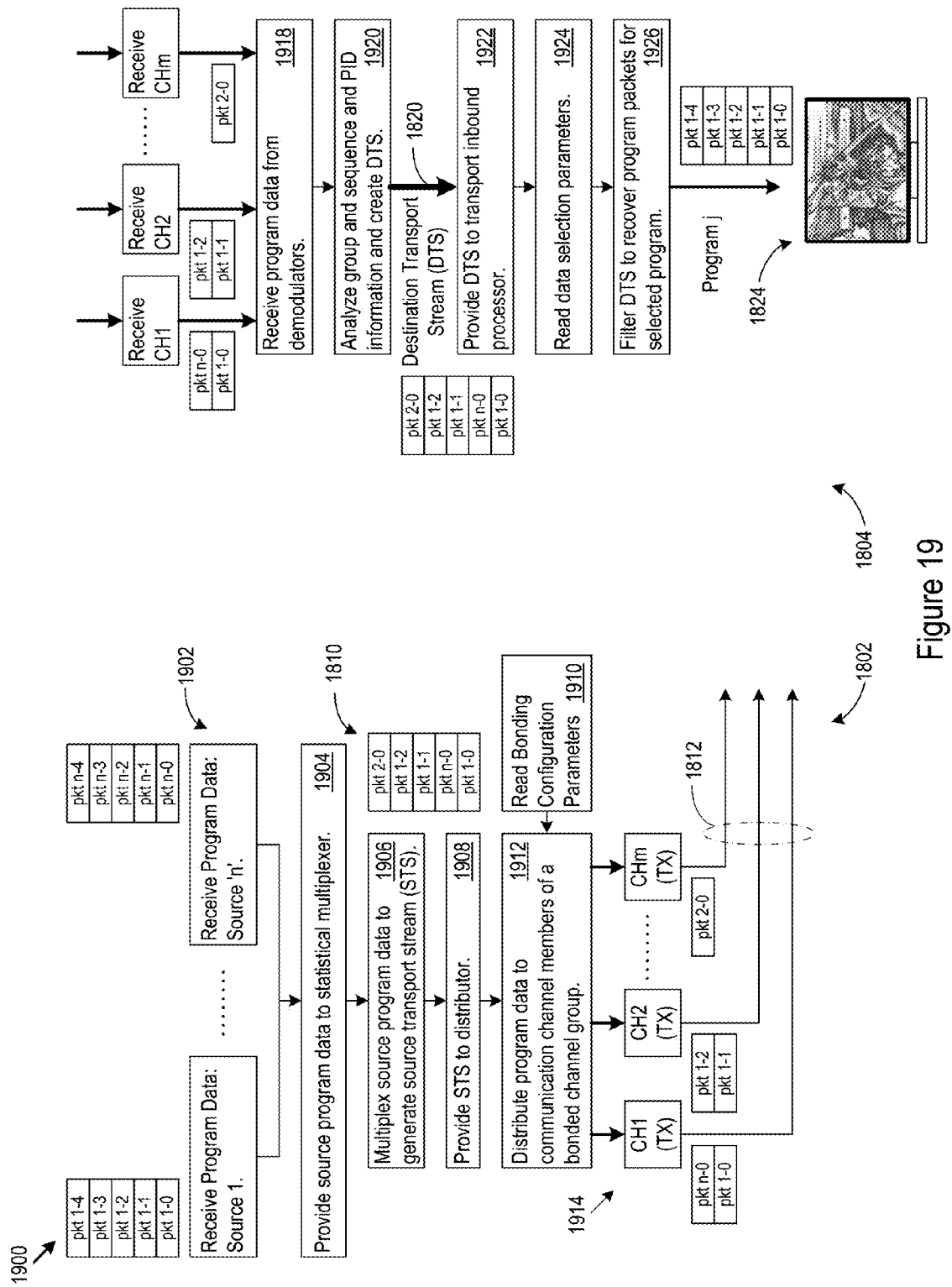
FIG. 19 shows an example of logic for content delivery using channel bonding.

FIG. 19 shows an example of logic 1900 for content delivery using channel bonding that the architecture 1800 described above may implement in hardware, software, or both. Additional detailed examples are provided below, particularly with regard to marker packets and other options.

In FIG. 19, program data is received from content input sources (e.g., Source 1 . . . Source 'n') (1902). The program data may be received from any content provider, and may include any desired audio, visual, or data content, including cable television programming, streaming music, file transfer data, as just three examples. The input sources provide the program data to the statistical multiplexer 1806 (1904), which multiplexes the program data to generate the source transport stream (STS) 1810 (1906).

The source 1802 provides the STS 1810 to the distributor 1808 (1908). The distributor 1808 reads bonding configuration parameters (1910). The bonding configuration parameters may specify the number of communication channels in the bonded channel group 1812, the communication channels that may be included in the bonded channel group 1812, the type of communication channels that may be included in the bonding channel group 1812, the program sources eligible for bonding, when and for how long communication channels and program sources are available for channel bonding, bonding adaptation criteria, and any other parameters that may influence how and when the distributor 1808 pushes program data across the communication channels in the bonded channel group 1812. The distributor 1808 sends the program data to the communication channels in the bonded channel group 1812 (1912). Specific examples of how the distributor 1808 accomplishes this are provided below.

Further, distributor 1808 may determine at least one characteristic of the source data and/or the communication channels. The at least one characteristic may include bonding configuration parameters, a bandwidth required by the source data, a desired reliability of transmission, and/or a video frame type. The distributor may select a number of communication channels to use in the bonded group of communication channels based on the at least one determined characteristic. The selection of communication channels to use in the bonded group may be modified variably based on any change in the at least one determined characteristic. In some implementations, the distributor may be configured to identify a transmission characteristic associated with transmission of the source data and variably select a plurality of communication channels having a selected orbital angular momentum (OAM) to be bonded as a bonded group of communication channels to accommodate the determined transmission characteristic.

The source data may be partitioned into groups of bits and distributed to the communication channels in the bonded channel group 1812 based on the at least one determined characteristic. As such, the groups may be distributed in a unique order, according to an interleaved procedure, in a round robin fashion, using redundancy and/or to predetermined channel, in response to the at least one determined characteristic. The source 1802 thereby communicates program data to the destination 1804 across the multiple communication channels in the bonded channel group 1812 (1914).

At the destination 1804, the demodulators 1816 receive the program data over the communication channels (1918). The demodulators 1816 provide the recovered program data (optionally after buffering) to the collator 1818. The collator 1818 analyzes group information, sequence information, PIDs, and any other desired information obtained from the data packets arriving on the communication channels and creates a destination transport stream (DTS) 1820 from the recovered program data (1920). The DTS 1820 may convey the program packets in the same sequence as the STS 1810, for example.

The collator 1818 provides the DTS 1820 to the TIP 1822 (1922). The TIP 1822 reads data selection parameters (1924). The data selection parameters may specify, for example, which audio/visual program is desired, and may be obtained from viewer input, from automated selection programs or processes (e.g., in a digital video recorder), or in other ways. Accordingly, the TIP 1822 filters the DTS 1820 to recover the program packets that match the data selection parameters (e.g., by PID filtering) (1926). The TIP 1822 thereby generates a content output that includes an output packet stream for the selected program. The TIP 1822 delivers the generated content to any desired device 1824 that consumes the content, such as televisions, smart phones, personal computers, or any other device.

Several channel bonding processing options available. Some options utilize marker packets (MPs) inserted into the data streams going to the destination 1804 over the communication channels. The marker packets may be MPEG2 TS packets, for example, with an identifier that flags them as MPs. In a first option, the distributor 1808 adds marker packets on a per-channel basis, for example in a round-robin manner. In a second option, the distributor 1808 generates and adds markers on a per-chunk basis, for example in a round-robin manner at chunk boundaries. In a third option, when packets from the same program will be routed to multiple communication channels, each packet receives a program ID and a sequence ID, and no marker packets are needed. In a fourth option, spare bits in network frames defined below the network layer, e.g., at the data-link layer, carry channel bonding information to the source 1804.

Figure 20:
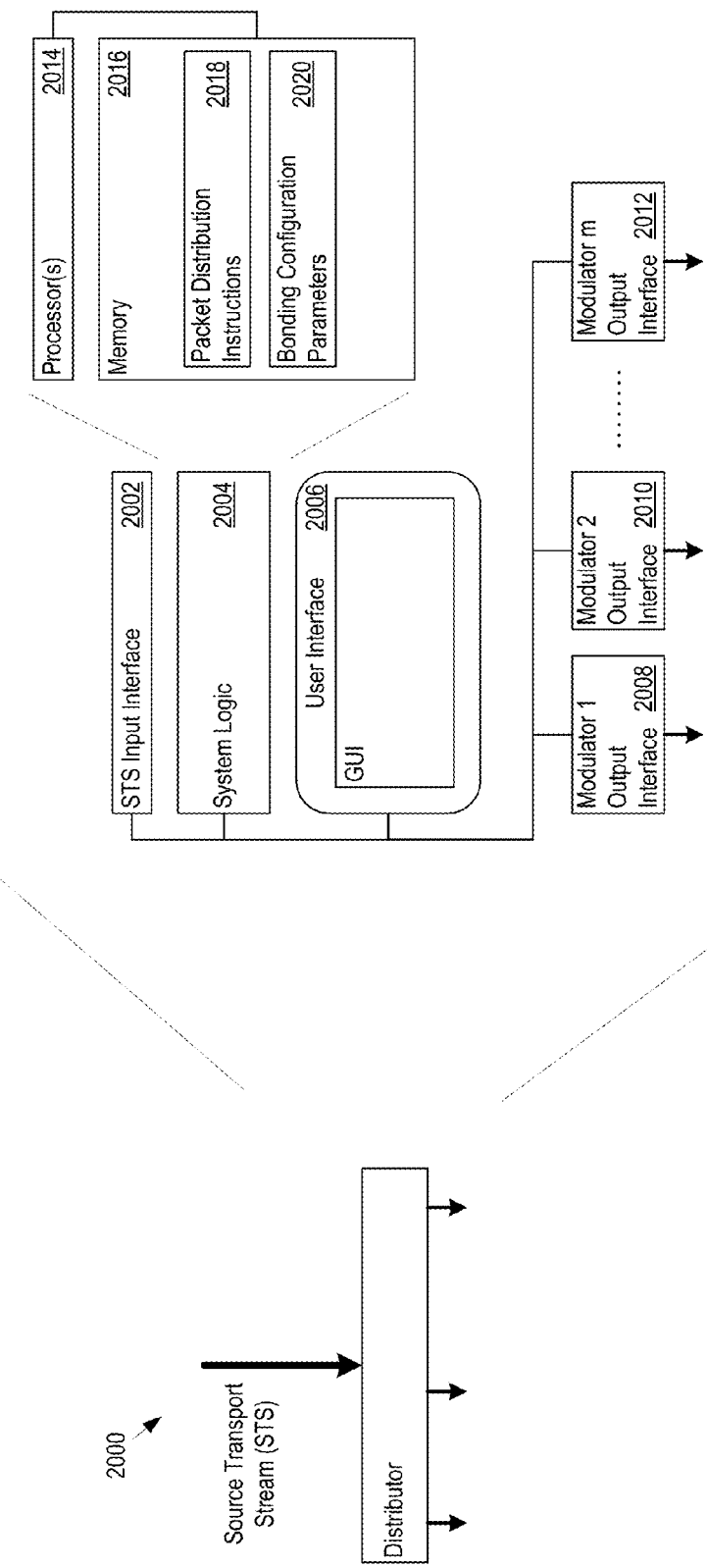
FIG. 20 shows an example implementation of a distributor.

Turning now to FIG. 20, the figure shows an example implementation of a distributor 2000, for example corresponding with distributor 1808. The distributor 2000 includes an STS input interface 2002, system logic 2004, and a user interface 2006. In addition, the distributor 2000 includes modulator output interfaces, such as those labeled 2008, 2010, and 2012. The STS input interface 2002 may be a high bandwidth (e.g., optical fiber) input interface, for example. The modulator output interfaces 2008-2012 feed data to the modulators that drive data over the communication channels. The modulator output interfaces 2008-2012 may be serial or parallel bus interfaces, as examples.

The system logic 2004 implements in hardware, software, or both, any of the logic described in connection with the operation of the distributor. As one example, the system logic 2004 may include one or more processors 2014 and program and data memories 2016. The program and data memories 2016 hold, for example, packet distribution instructions 2018 and the bonding configuration parameters 2020.

The processors 2014 execute the packet distribution instructions 2018, and the bonding configuration parameters 2020 inform the processor as to the type of channel bonding the processors 2014 will perform. As a result, the processors 2014 may implement the round-robin packet by packet distribution or round-robin chunk by chunk distribution described above, including MP generation, or any other channel bonding distribution pattern. The distributor 2000 may accept input from the user interface 2006 to change, view, add, or delete any of the bonding configuration parameters 2020 or any channel bonding status information.

Figure 21:
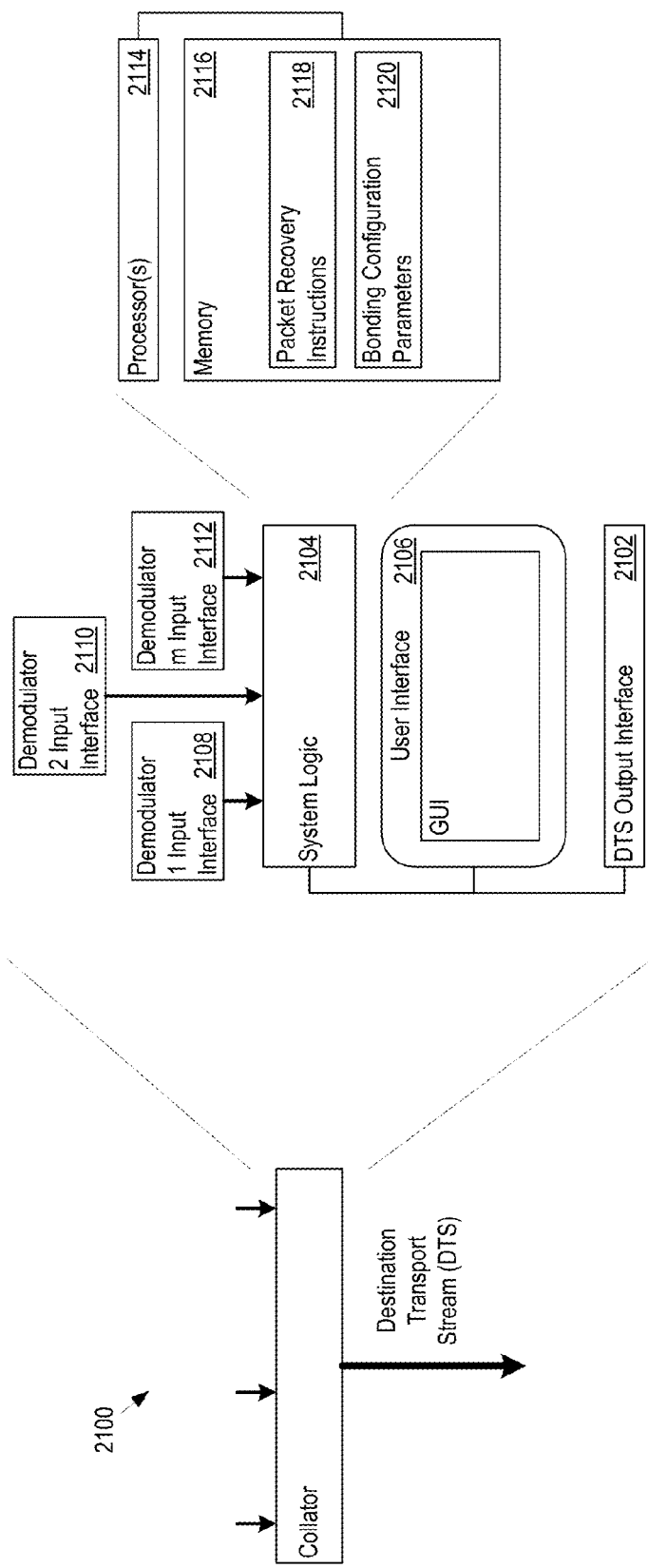
FIG. 21 shows an example implementation of a collator.

FIG. 21 shows an example implementation of a collator 2100. The collator 2100, for example corresponding to collator 1818, includes a DTS output interface 2102, system logic 2104, and a user interface 2106. In addition, the collator 2100 includes demodulator input interfaces, such as those labeled 2108, 2110, and 2112. The DTS output interface 2102 may be a high bandwidth (e.g., optical fiber) output interface to the TIP, for example. The demodulator output interfaces 2108-2112 feed data to the collator system logic which will create the DTS from the data received from the demodulator input interfaces 2108-2112. The demodulator input interfaces 2108-2112 may be serial or parallel bus interfaces, as examples.

The system logic 2104 implements in hardware, software, or both, any of the logic described in connection with the operation of the collator 2100. As one example, the system logic 2104 may include one or more processors 2114 and program and data memories 2116. The program and data memories 2116 hold, for example, packet recovery instructions 2118 and the bonding configuration parameters 2120.

The processors 2114 execute the packet recovery instructions 2118, and the bonding configuration parameters 2120 inform the processor as to the type of channel bonding the processors 2114 will handle. As a result, the processors 2114 may implement the round-robin packet by packet reception or round-robin chunk by chunk reception described above, including MP synchronization, or any other channel bonding distribution recovery logic. The collator 2100 may accept input from the user interface 2106 to change, view, add, or delete any of the bonding configuration parameters 2120, to specify which channels are eligible for channel bonding, or to set, view, or change any other channel bonding status information.

The architectures described above may also include network nodes between the source 1802 and the destination 1804. The network nodes may be type of packet switch, router, hub, or other data traffic handling logic. The network nodes may be aware of the communication channels that they are connected to, both on the inbound side, and on the outbound side. Accordingly, a network node may receive any particular set of communication channels in a channel bonding group, but need not have a matching set of communication channels in the outbound direction. In that case, the network node may filter the received communication channel traffic, to drop packets for which the network node does not have a corresponding outbound communication channel, while passing on the remaining traffic flow over the outbound communication channels to which it does have a connection.

In concert with the above, the channel bonding may happen in a broadcast, multicast, or even a unicast environment. In the broadcast environment, the source 1802 may send the program packets and MPs to every endpoint attached to the communication channels, such as in a wide distribution home cable service. In a multicast environment, however, the source 1802 may deliver the program packets and MPs to a specific group of endpoints connected to the communication channels. In this regard, the source 1802 may include addressing information, such as Internet Protocol (IP) addresses or Ethernet addresses, in the packets to specifically identify the intended recipients. In the unicast environment, the source 1802 may use addressing information to send the program packets and the MPs across the bonded channel group 1812 to a single destination.

In other implementations, channel bonding data fields may be added to the program packets at the source 1802. The channel bonding data fields may be added to the packet header, payload, or both. The channel bonding data fields may identify for the destination 1804 how to order received packets to create the DTS 1820. In that regard, the channel bonding data fields may include PID information, sequence information, channel number information, group number information, or other data that the collator 1818 may analyze to determine packet output order in the DTS 1820.

Audio/video content is usually compressed and transmitted as a sequence of compressed frames. For the video content, there are usually three types of compressed frames (or pictures): I-frame (intra-coded picture), P-frame (predicated picture) and B-frame (bi-predictive picture). The I-frame allows the original video picture to be decoded (or decompressed) independently without any information from other frames. The P-frame relies on the previous frame for decoding. The B-frame needs the information from both previous and forward frames for decoding. To ensure the good quality of the decoded video at the receiving side, I-frames must be transmitted with high reliability.

In one or more embodiments, OAM channel bonding may be applied to the transmission of audio/visual data. The input A/V bit stream may be first classified into I, B, or P-frames. For the information bits of an I-frame, an interleaving procedure, for example as described elsewhere in this disclosure, is carried out by the preprocessing module, ensuring high transmission reliability. For the information bits of a B or P-frame, the direct mapping may be carried out by the preprocessing module, increasing the transmission rate with lowered reliability.

Figure 22:
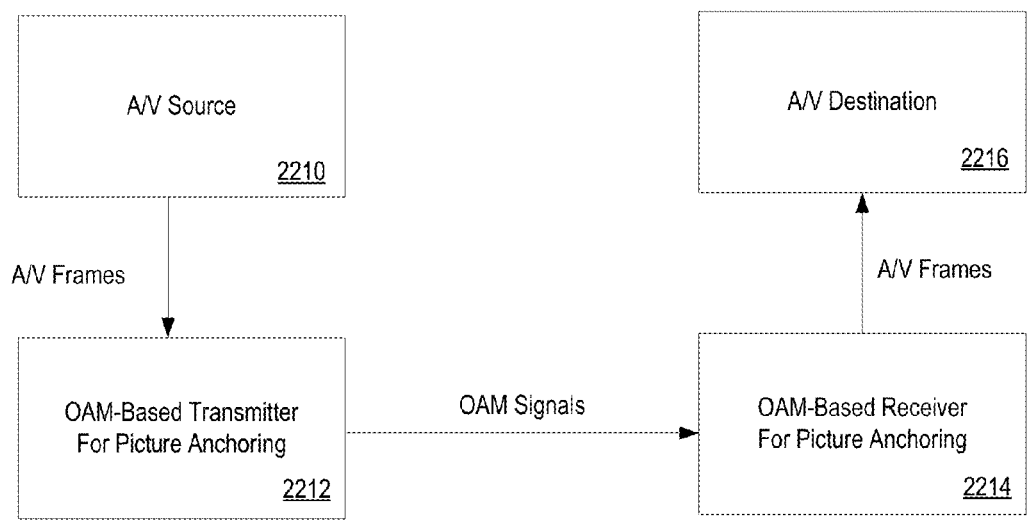
FIG. 22 is a schematic illustration of an OAM channel bonding system for audio/visual streams.

FIG. 22 is a schematic view of a system for transmitting audio/visual data from an audio/visual source 2210 to an audio/visual destination 2216 using a channel bonded OAM technique. The audio/visual data is provided from the audio/visual source 2210 to an OAM based transmitter 2212. The OAM transmitter 2212 performs picture anchoring and distributes the audio/visual data across the bonded OAM signals (e.g. multiple channels having different levels of orbital angular momentum). The OAM transmitter 2212 transmits the OAM signals to the OAM based receiver 2214. The OAM based receiver 2214 reassembles the audio/visual data stream performs picture anchoring. The OAM based receiver 2214 then forwards the audio/visual signals to the audio/visual destination 2216.

Figure 23:
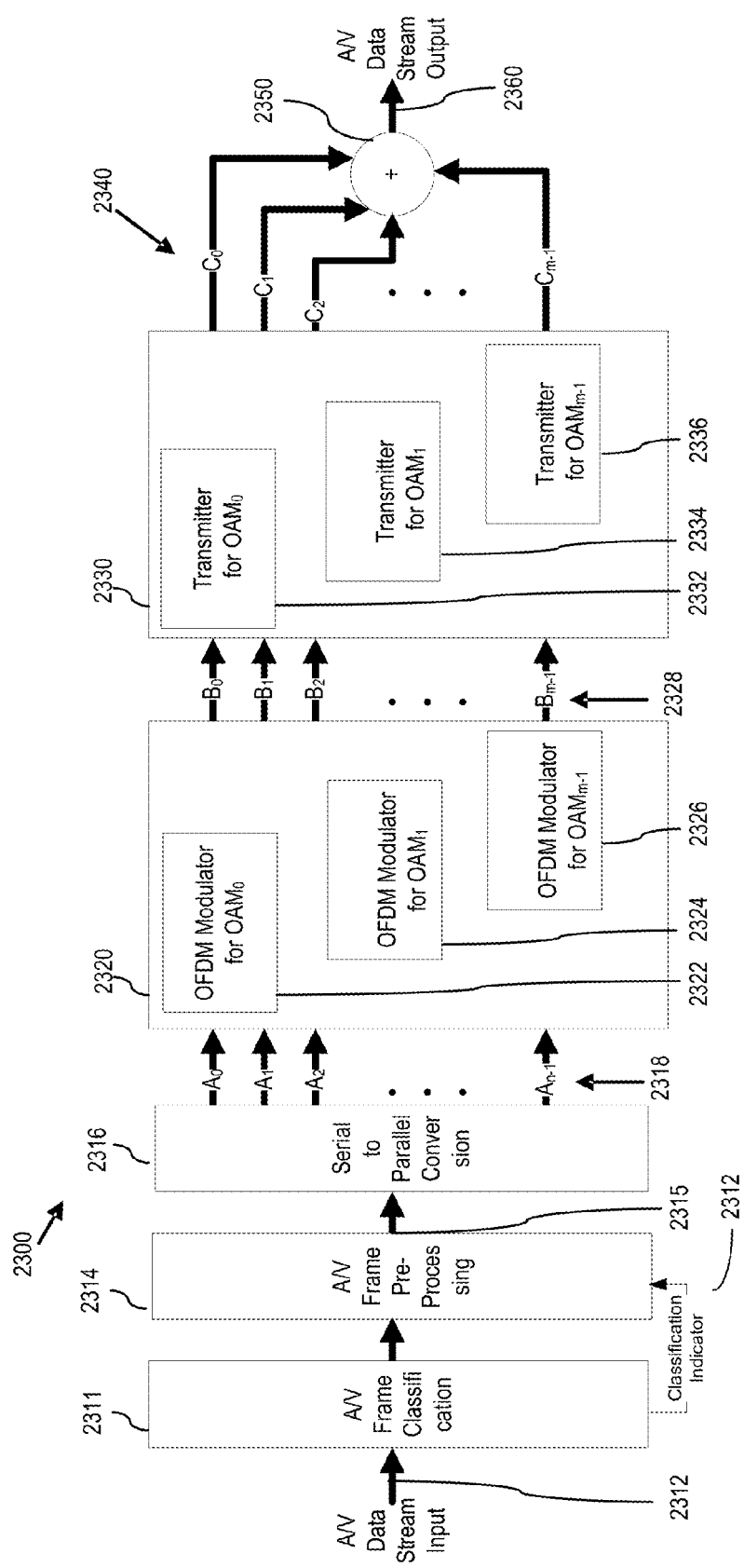
FIG. 23 is a schematic illustration of an OAM transmitter for channel bonding.

FIG. 23 is a schematic view of an OAM-based transmitter 2300 in accordance with one or more embodiments of this disclosure. The OAM transmitter 2300 may be implemented in one or more channel bonding devices and may operate in a manner similar to the OAM-based transmitter 110. An audio/visual data stream input 2312 may be received by a frame classification unit 2311. The frame classification unit 2311 may provide the data stream and a classification indicator 2313 to the preprocessing unit 2314. The classification indicator 2313 may indicate the frame type (e.g. I, P, or B-frame) of each video frame. The preprocessing unit 2312 may break the stream into groups of bits which may be packaged as individual packets or individual communication units. In this manner, the preprocessing unit 2314 may have the same functionality of the distributors described elsewhere in this application.

For data requiring fast transmission, the bits of each input bit group may be directly mapped as the preprocessor output bit group without any alternation. However, for the types of information that require high transmission reliability, each input bit group may be mapped into the preprocessor output bit group via a interleaving map method, as described above with regard to FIGS. 6 and 7. The serial data 2315 from the preprocessing unit 2314 is provided to a serial-to-parallel converter 2316. The serial-to-parallel converter 2316 multiplexes the serial stream 2315 into a parallel data stream 2318. The parallel data stream 2318 is provided to a modulator circuit 2320.

The modulator circuit 2320 may include a modulator for each orbital state. As such, each orbital state may correspond to a different channel. Each modulator may be an OFDM modulator corresponding to each orbital state. As such, modulator 2322 may correspond to the first channel, modulator 2324 may correspond to the second channel, and modulator 2326 may correspond to the last channel. It is understood that the number of channels is scalable based on application requirements. The modulator data 2328 is transmitted from the modulator circuit 2320 to transmitter circuit 2330. The transmitter circuit 2330 may include an individual transmitter for each channel. For example, transmitter 2332 may communicate with the first channel. Further, the transmitter 2334 may communicate with the second channel, while transmitter 2336 may communicate with the last channel. The transmitter output 2340 may be summed, for example, through an antenna arrangement 2350. The antenna arrangement 2350 may transmit data output stream 2360 to the receiving device for example, a set top box or gateway.

Figure 24:
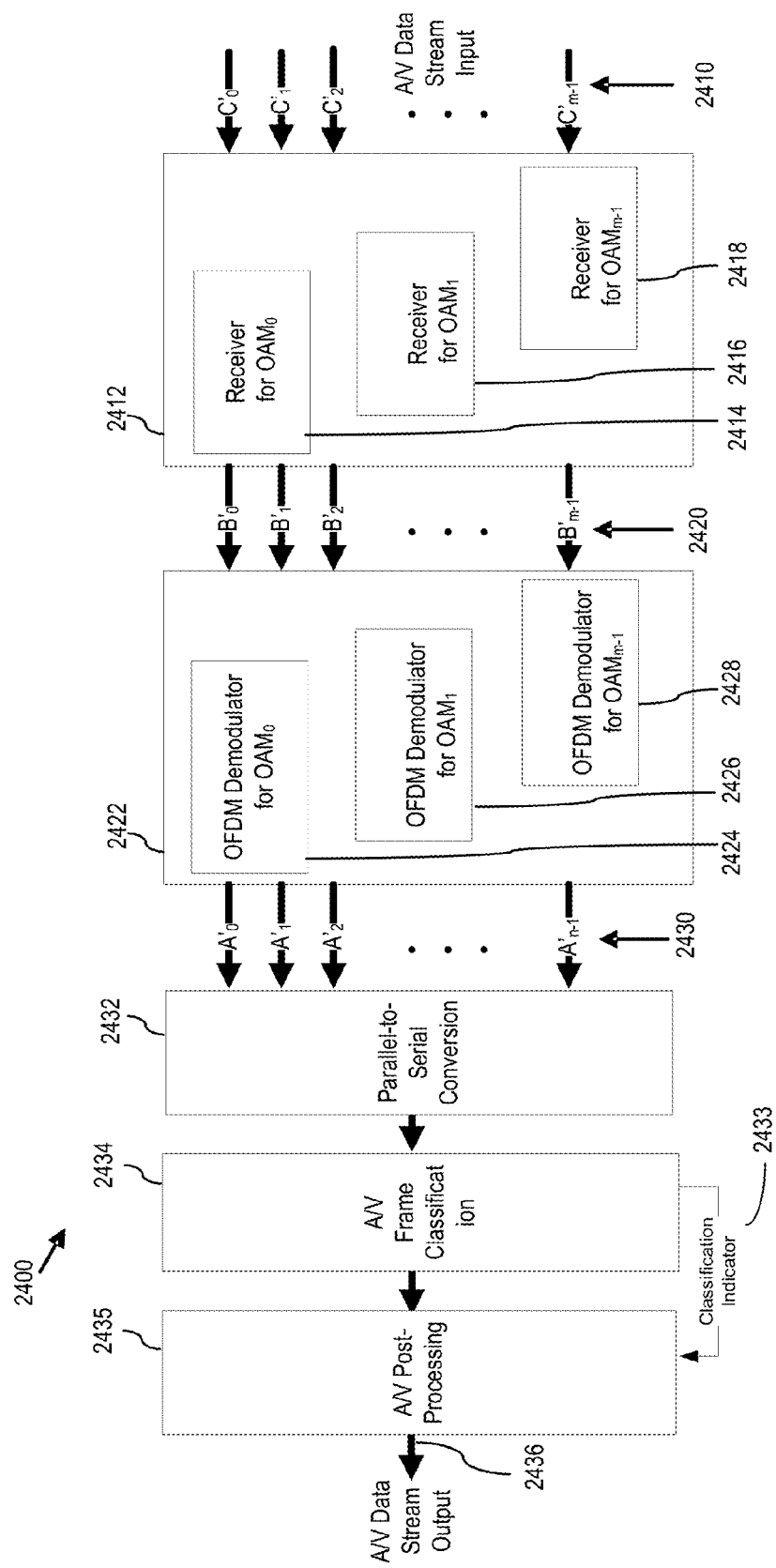
FIG. 24 is a schematic illustration of an OAM receiver for channel bonding.

FIG. 24 is a schematic view of an OAM-based receiver 2400 for receiving audio/video data over bonded OAM channels. The data stream input 2410 is received from the OAM-based transmitter 2300. The audio/video data stream input 2410 is provided to a receiver circuit 2412. The receiver circuit 2412 includes a receiver for each orbital state and/or channel. As such, receiver 2414 may be for the first channel. Further, receiver 2416 may receive the second channel and receiver 2418 may receive the last channel. The receiver circuit 2412 provides the parallel orbital channels to demodulator circuit 2422. The demodulator circuit 2422 may include a demodulator for each channel. For example, the first channel may be demodulated by demodulator 2424. The second channel may be demodulated by demodulator 2426 and the last channel may be demodulated by demodulator 2428.

In some implementations, the demodulators 2424, 2426, 2428 may be OFDM demodulators. The demodulator circuit 2422 may remove the $h_i(t)$ function demodulation from each channel and reconstruct the data stream. The demodulator circuit 2422 may use redundancy across the channels to correct any errors in the transmission and provide parallel outputs 2430 across the orbital channels to the parallel to serial conversion module 2432. The parallel to serial conversion module 2432 generates a single serial stream that is provided to a frame classification unit 2434. The frame classification unit 2434 may determine the frame type. The frame classification unit 2434 may provide the video stream and a classification indicator 2433 to the post processing module 2435. The post processing module 2435 may remap the bits into an output data stream 2436 matching original audio/video stream received by the OAM based transmitter.

In accordance with the various embodiments described herein, orbital angular momentum (OAM) may be utilized to perform channel bonding across an increased or variable number of channels at the same frequency (or across multiple frequencies for even greater data transmission performance). Twist encoding techniques can be used to impart orbital angular momentum on signals, which is a result of the phase fronts of the waves rotating relative to their direction of propagation to create a vortex pattern (i.e., a pattern resembling a corkscrew). Orbital angular momentum can, in principle, take an infinite number of values which allows a large number of data channels to be created using a finite amount of bandwidth. The use of orbital angular momentum (OAM) encoded signals allows addition channels to be created over the same bandwidth (e.g., over the same frequency or wavelength) in order to vastly increase the throughput of both wireless, wired and fiber-optic networks, where, for example, channel bonding can be performed as needed or desired across an increased or variable number of channels at the same frequency created using OAM.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the architectures may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method, comprising:
receiving source data to be transmitted to a destination device;
determining at least one characteristic of the source data or communication channels;
selecting a number of the communication channels of a plurality of communication channels to use in a bonded group of communication channels based on the at least one determined characteristic, wherein at least a portion of the communication channels in the bonded group of communication channels are formed to have an orbital angular momentum (OAM);
partitioning the source data into groups of bits and distributing to the at least a portion of the communication channels in the bonded group of communication channels based on the at least one determined characteristic;
distributing the groups in a first order to a first channel of the at least a portion of the communication channels and distributing the groups in a second order to a second channel of the at least a portion of the communication channels; and
transmitting the source data over the bonded group of communication channels.

2. The method of claim 1, wherein the at least one determined characteristic includes a bandwidth required by the source data.

3. The method of claim 1, wherein the at least one determined characteristic includes a desired reliability of the transmission of the source data to the destination device.

4. The method of claim 1, further comprising distributing the groups to the at least a portion of the communication channels in a round robin fashion.

5. The method of claim 1, further comprising distributing the groups to a predetermined communication channel of the at least a portion of the communication channels in response to the at least one characteristic.

6. The method of claim 1, further comprising forming a first channel of the communication channels to have a first orbital angular momentum and a second channel of the communication channels to have a second orbital angular momentum.

7. The method of claim 1, further comprising forming a plurality of the communication channels in the bonded group to each have a different respective orbital angular momentum (OAM) at a same frequency.

8. A method, comprising:
receiving source data to be transmitted to a destination device;
determining a transmission characteristic associated with the transmission of the source data;
variably selecting a plurality of communication channels having a selected orbital angular momentum (OAM) to be bonded as a bonded group of communication channels to accommodate the determined transmission characteristic;
partitioning the source data into groups of bits and distributing to the at least a portion of the communication channels in the bonded group of communication channels based on the determined transmission characteristic;
distributing the groups in a first order to a first channel of the at least a portion of the communication channels and distributing the groups in a second order to a second channel of the at least a portion of the communication channels;
transmitting the source data over the bonded group of communication channels.

9. The method of claim 8, further modifying a number of communication channels variably selected to be part of the bonded group of communication channels to accommodate changes in the determined transmission characteristic.

10. The method of claim 8, wherein each communication channel in the bonded group of communication channels that has a same frequency is formed to have a different orbital angular momentum (OAM) than other communication channels transmitting at the same frequency.

11. The method of claim 8, wherein the transmission characteristic includes a bandwidth required by the source data.

12. The method of claim 8, wherein the transmission characteristic includes a desired reliability for the transmission of the source data to the destination device.

13. The method of claim 8, wherein the transmission characteristic includes a video frame type of the source data.

14. The method of claim 8, further comprising distributing the source data to the bonded group of communication channels redundantly in response to the transmission characteristic.

15. The method of claim 8, further comprising distributing the source data in unique order to each communication channel of the bonded group of communication channels in response to the transmission characteristic.

16. The method of claim 8, further comprising distributing the source data to a predetermined communication channel of the bonded group of communication channels in response to the transmission characteristic.

17. A method, comprising:
receiving source data to be transmitted to a destination device;
determining at least one characteristic of the source data or the communication channels;
selecting a number of the communication channels of a plurality of communication channels to use in a bonded group of communication channels based on the at least one determined characteristic;
partitioning the source data into groups of bits and distributing to the at least a portion of the communication channels in the bonded group of communication channels based on the at least one determined characteristic;
distributing the groups in a first order to a first channel of the at least a portion of the communication channels and distributing the groups in a second order to a second channel of the at least a portion of the communication channels;
transmitting the source data over a group of communication channels;
multiplexing the source data to the group of communication channels using orthogonal frequency-division multiplexing (OFDM); and
applying orbital multiplexing techniques for distributing the source data across the group of communication channels.

18. The method of claim 17, further comprising distributing the source data to the bonded group of communication channels redundantly in response to the at least one determined characteristic.

19. The method of claim 17, further comprising distributing the source data in unique order to each communication channel of the bonded group of communication channels in response to the at least one determined characteristic.

* * * * *